United States Patent
Limberg et al.

(10) Patent No.: US 6,496,230 B1
(45) Date of Patent: Dec. 17, 2002

(54) DIGITAL TV SIGNAL RECEIVER WITH DIRECT CONVERSION FROM UHF I-F TO LOW-BAND I-F BEFORE DIGITAL DEMODULATION

(75) Inventors: Allen LeRoy Limberg, Vienna, VA (US); Chandrakant Bhailalbhai Patel, Hopewell Township, NJ (US)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/397,019

(22) Filed: Sep. 15, 1999

(51) Int. Cl.$^7$ .......................... H04N 5/44; H04N 5/455

(52) U.S. Cl. ........................ 348/725; 348/726; 348/729

(58) Field of Search ................................ 348/725, 726, 348/737; 455/302, 307, 314, 296, 324; 375/326; 329/307, 308

(56) References Cited

U.S. PATENT DOCUMENTS

| 5,737,035 A | * | 4/1998 | Rotzoll ........................ 348/725 |
| 5,918,168 A | * | 6/1999 | Abe et al. .................... 455/315 |
| 5,949,472 A | * | 9/1999 | Dang et al. .................... 348/11 |
| 6,005,640 A | * | 12/1999 | Strolle et al. ................ 348/726 |
| 6,133,964 A | * | 10/2000 | Han ........................... 348/726 |
| 6,177,964 B1 | * | 1/2001 | Birleson et al. ............. 348/725 |
| 6,377,315 B1 | * | 4/2002 | Carr et al. .................. 348/726 |

* cited by examiner

Primary Examiner—John Miller
Assistant Examiner—Annan Q Shang
(74) Attorney, Agent, or Firm—Sughrue Mion, PLLC

(57) ABSTRACT

A plural-conversion digital television signal receiver that embodies the invention upconverts digital television signal from a selected television channel to a UHF initial I-F signal. After image-rejection filtering there is a single-step downconversion of the initial UHF first I-F signal to a low-band final I-F signal, the uppermost frequency of which is in the high-frequency band. The low-band final I-F signal is digitized and demodulated in the digital regime to generate a baseband signal.

15 Claims, 8 Drawing Sheets

DIGITAL TV SIGNAL RECEIVER WITH DIRECT CONVERSION FROM UHF I-F TO LOW-BAND I-F BEFORE DIGITAL DEMODULATION

The invention relates to radio receivers of a type suitable for receiving broadcast digital television signals.

BACKGROUND OF THE INVENTION

Television signal receivers for receiving digital television (DTV) signals that have been proposed by the Grand Alliance, a group of DTV proponents including Zenith Electronics Corporation, use plural-conversion radio receivers. During the first detection procedure in these plural-conversion radio receivers, DTV signal in a selected one of the ultra-high-frequency (UHF) channels is up-converted in frequency to first intermediate-frequency signal in a first intermediate-frequency band centered at 920 MHz. This puts the image frequencies above 1 GHz, making them easy to reject by fixed-tuned front-end filtering. The upconverted DTV signals are then amplified in a first intermediate-frequency amplifier that uses ceramic resonators for tuning. The resulting amplified first intermediate-frequency signal is then down-converted in frequency by mixing it with 876 MHz local oscillations, resulting in a second intermediate-frequency signal in a second intermediate-frequency band 6 MHz wide centered at 44 MHz. The overall amplitude and phase characteristics of the receiver are controlled using a surface-acoustic-wave (SAW) filter for selecting the second intermediate-frequency band. This second intermediate-frequency signal, as selected by the SAW filter, is then amplified in a second intermediate-frequency amplifier. The response of the second I-F amplifier is then synchrodyned to baseband. This synchrodyning procedure can be a direct one in which the response of the second I-F amplifier is synchronously detected at the frequency of the data carrier in the second I-F band.

Alternatively, as described by C. B. Patel and A. L. R. Limberg in U.S. Pat. No. 5,479,449 issued Dec. 26, 1995 and entitled "DIGITAL VSB DETECTOR WITH BAND-PASS PHASE TRACKER, AS FOR INCLUSION IN AN HDTV RECEIVER", this synchrodyning procedure can proceed by stages. A final I-F signal referred to as a "low-band" final I-F signal is used that has its uppermost frequency in the HF band, which extends from 3 to 30 MHz. U.S. Pat. No. 5,479,449 describes the response of the second I-F amplifier being downconverted to a third and final intermediate-frequency band somewhere in the one to eight megahertz frequency range, rather than being downconverted to baseband, and then synchronously detected at the frequency of the data carrier in the final I-F band. This alternative synchrodyning procedure is preferable if synchronous detection is done in the digital regime, rather than the analog regime, since the sampling rates required in analog-to-digital conversion can be lowered sufficiently to make such conversion practical with currently available technology. Analog-to-digital conversion of second I-F signals in a second I-F band 6 MHz wide centered at 44 MHz is difficult to do with the requisite 10- to 12-bit resolution, and analog-to-digital converters capable of such performance currently are considered to be too expensive to include in a mass-market consumer product. However, the two-step downconversion from the UHF first I-F band to the final I-F band somewhere in the one to eight megahertz frequency range, still involves some expense.

Television receivers for receiving analog television signals transmitted according to the National Television Systems Committee (NTSC) broadcasting standard are almost invariably single-conversion receivers. These receivers have generally used an I-F band 6 MHz wide centered at 44 MHz. When UHF television broadcasting was instituted the 21.25–27.25 MHz I-F band commonly used in VHF-only television receivers exhibited image rejection problems when UHF signals were being received. In order to avoid image frequencies falling into the reception band a higher intermediate frequency was necessary, and centering of the I-F band at 44 MHz became standard. Since DTV receivers use plural-conversion to allow UHF transmitters to broadcast with less frequency separation between their respective transmission channels, the use of the VHF I-F to avoid problems with images is not necessary.

Accordingly, a single-step downconversion from the UHF first I-F signal to a low-band final I-F signal should be feasible, the inventors realized. This low-band final I-F signal can have its uppermost frequency below 10 megahertz or so as described in U.S. Pat. No. 5,479,449. However, advances in analog-to-digital conversion now make digitization with 10-bit to 12-bit resolution sampling rates somewhat over 80 megahertz feasible, so the final I-F signal can have its uppermost frequency further up in the HF range. The final I-F signal can be in the 21.25–27.25 MHz I-F band used in VHF-only television receivers of the past, for example. Locating the final I-F signal at higher frequencies in the HF band facilitates the use of surface-acoustic-wave (SAW) filtering in the amplifier for the final I-F signal, the inventors note.

The Advanced Television Systems Committee (ATSC) standard for digital television broadcasting uses vestigial-sideband amplitude modulation of a carrier 310 kilohertz above the lower edge of the six-megahertz-wide transmission channels. Eight-level (3 bits/symbol) one-dimensional-constellation symbol coding at 10,762,238 symbols per second rate is specified for over-the-air transmission. The inventors note that a carrier frequency of 21.52 MHz, as could repose in a 21.20 to 27.20 MHz DTV final I-F signal band or in a 15.83 to 21.83 MHz DTV final I-F signal band, is harmonically related to this symbol rate. Further, the inventors discern that sampling at 4×21.52=86.08 million samples per second more than adequately samples the 21.52 MHz carrier frequency, to facilitate synchronizing a carrier wave regenerated in the receiver to that carrier using an automatic frequency and phase control (AFPC) feedback loop. The 86 MHz analog-to-digital converters can be used as the demodulators to baseband, by selecting alternate samples and then inverting every other one of the selected samples.

SUMMARY OF THE INVENTION

A plural-conversion digital television signal receiver that embodies the invention upconverts digital television signal from a selected television channel to a UHF initial I-F signal. After image-rejection filtering there is a single-step downconversion of the initial UHF first I-F signal to a low-band final I-F signal, the uppermost frequency of which is in the high-frequency band. The low-band final I-F signal is digitized and demodulated in the digital regime to generate a baseband signal.

DETAILED DESCRIPTION

Figure 1:
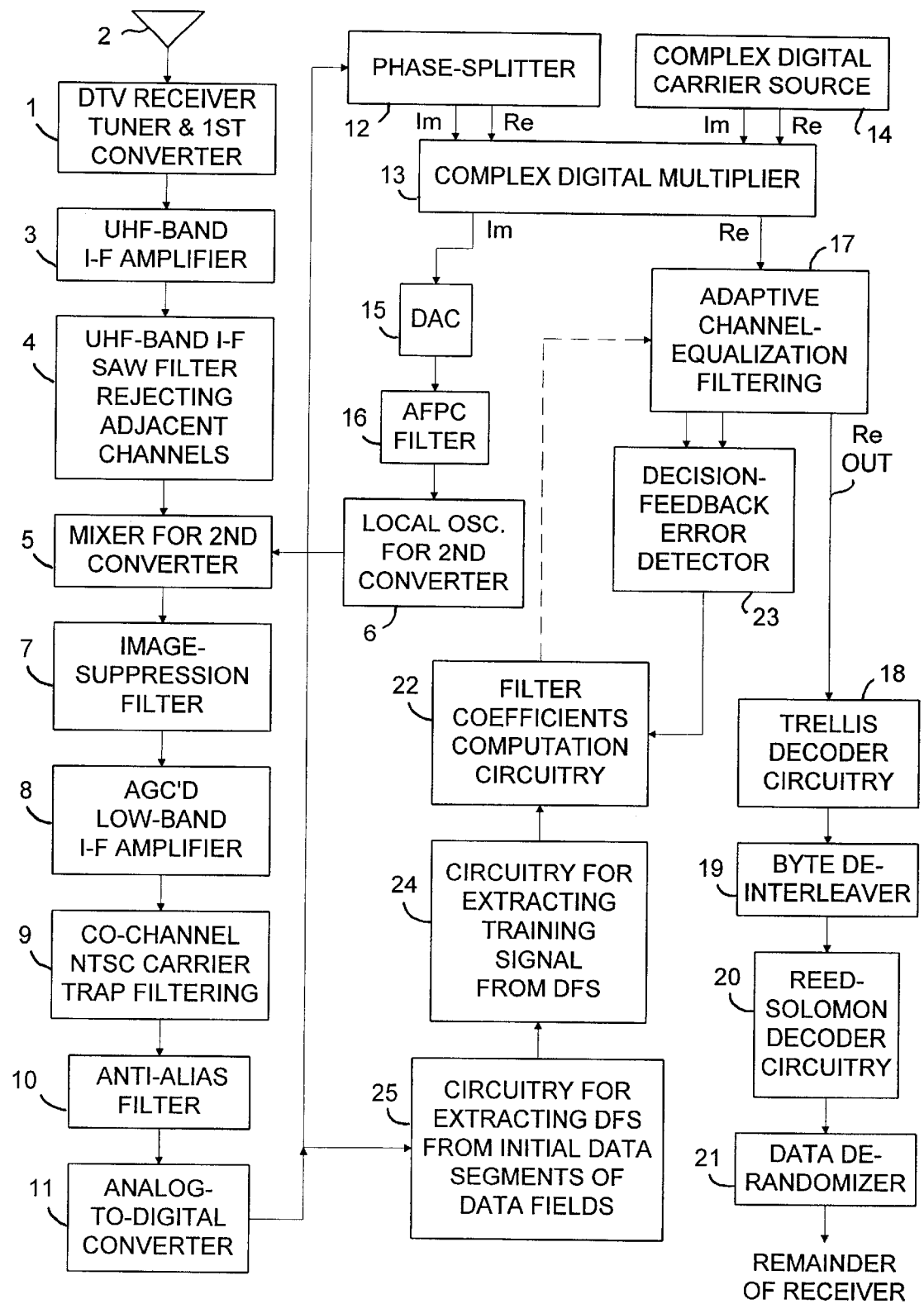
FIG. 1 is a schematic diagram of a plural-conversion DTV signal receiver, which receiver in accordance with the invention upconverts a selected DTV signal to a UHF initial intermediate-frequency band, then performs a single-step downconversion to a final intermediate-frequency band the uppermost frequency of which is in the HF band, and subsequently digitizes the DTV signal before synchrodyning it to baseband in digital demodulator circuitry.

FIG. 1 shows a DTV signal receiver that synchrodynes low-band final-intermediate-frequency signals to baseband in the digital regime. The FIG. 1 DTV signal receiver includes tuner and first converter circuitry 1 for generating an ultra-high-frequency (UHF) intermediate-frequency (I-F) signal in response to received broadcast DTV signals, which FIG. 1 shows being supplied from an antenna 2. FIG. 1 shows a broadcast receiving antenna 2 arranged to capture the DTV signals for the tuner and first converter circuitry 1. Alternatively, the tuner and first converter circuitry 1 can be connected for receiving DTV signals from a narrowcast receiving antenna or from a cablecast transmission system.

The tuner and first (frequency) converter circuitry 1 is similar to that used in prior-art DTV signal receivers. The tuner input has a bandpass filter that limits the frequency range of radio-frequency input signals to the 50 to 810 MHz band, rejecting image frequencies above 920 MHz. The tuner also includes a broadband tracking filter that rejects television signals other than that selected for viewing, especially those signals of higher power such as analog TV signals in next-to-adjacent channels. The first converter includes a first local oscillator tunable over a range from 970 to 1730 MHz to place the initial I-F signal in a 6-MHz-wide band with the carrier nominally at 920 MHz. These local oscillator frequencies are such that any leakage from the tuner input will not interfere with UHF TV channels as may be received by another television signal receiver nearby. At the same time second harmonics of UHF TV channels 14 through 69 fall above the initial I-F band. The mixer in the first converter is a highly linear doubly-balanced type to avoid even harmonic generation. There is a broadband tuned coupling for rejecting image frequencies in output signal from the tuner and first converter circuitry 1, which output signal is supplied to an intermediate-frequency amplifier 3 as its input signal.

The I-F amplifier 3 supplies amplified UHF I-F signal for driving a first surface-acoustic-wave (SAW) filter 4. A SAW filter for these frequencies is usually constructed on a gallium arsenide substrate. The I-F amplifier 3 drives the SAW filter 4 from the source impedance prescribed for avoiding multiple reflections that interfere with obtaining good group delay and provides constant, linear gain to overcome the 10–12 dB insertion loss that is typically suffered in the SAW filter 4. The upconversion to the UHF intermediate frequencies facilitates the SAW filter 4 having a large number of poles and zeroes. The SAW filter 4 has a −1 dB to −1 dB bandwidth 5.5 to 6 MHz wide, and its passband is designed to pass those frequencies obtained by converting to the UHF I-F band those frequencies extending from the lower limit frequency of the television channel up to the upper limit frequency of the television channel. The SAW filter 4 determines the overall bandwidth of the DTV receiver, suppressing response to adjacent channels. Alternatively, ceramic resonators can be used instead of the SAW filter 4.

A second (frequency) converter comprises a linear mixer 5, a second local oscillator 6, and an image-suppression filter 7. The second local oscillator 6 is subject to automatic frequency and phase control (AFPC) as will be described in further detail further on in this specification. In the mixer 5 the response of the SAW filter 4 is heterodyned with oscillations from a second local oscillator 6, to generate a response to DTV signal translated to a low-band intermediate-frequency band below the frequencies assigned for television broadcasting. The uppermost frequency of the low-band final I-F signal is in the high-frequency (HF) band. The initial I-F signal exhibits a reversed frequency spectrum, with the carrier near the upper boundary of the received channel as translated to that UHF initial I-F band. In some embodiments of the invention the second local oscillator 6 supplies oscillations of a frequency higher than the UHF initial I-F band, so the low-band final I-F signal exhibits a twice-reversed or normal frequency spectrum, with the carrier near the lower boundary of the received channel as translated to the final I-F band. In other embodiments of the invention the second local oscillator 6 supplies oscillations of a frequency lower than the UHF initial I-F band, so the low-band final I-F signal also exhibits a reversed frequency spectrum, with the carrier near the upper boundary of the received channel as translated to the final I-F band.

The image-suppression filter 7 is used for rejecting the unwanted image frequencies that accompany the VHF downconversion result supplied from the mixer 5. The image-suppression filter 7 can be a second SAW filter, such second SAW filter being more practical to implement if the low-band final I-F signal is located at higher frequencies in the HF band. Since the steep skirts in amplitude response necessary to select against adjacent channels are provided in the first SAW filter 4, the second SAW filter need only provide a reasonably flat amplitude response and a reasonably linear phase response across the 6-MHz-wide channel. Accordingly, insertion loss in the second SAW filter can be kept reasonably low even though frequency is below the often-used 41–47 MHz intermediate frequency.

Alternatively, the image-suppression filter 7 can be an RLC filter, which preferably is of transitional Butterworth-Thomson type for preserving good transient response in the digital modulation. The design of such TBT filters is described by Y. Peless and T. Murakami in a paper "Analysis and Synthesis of Transitional Butterworth-Thomson Filters and Bandpass Amplifiers" in the March 1957 issue of RCA REVIEW, pp. 60–94. If the low-band I-F signal is no more than a few megahertz above zero frequency, the image-suppression filter 7 is preferably a TBT RLC lowpass filter.

The low-band I-F signal supplied as the response of the image-suppression filter 7 is applied as input signal to a low-band intermediate-frequency amplifier 8, which generates an amplified low-band I-F signal response to its input signal. The low-band I-F amplifier 8 is subject to automatic gain control (AGC) of a type which maintains linearity with gain reduction. For example, the low-band I-F amplifier 8 uses Gilbert multipliers as gain-control elements. FIG. 1 shows the low-band I-F amplifier 8 output signal being supplied to a trap filter 9 for the audio and video carriers of co-channel interfering NTSC signal, which trap filter 9 can be replaced by a direct connection in DTV receivers constructed after there is no longer analog television broadcasting in accordance with the NTSC standard. The trap filter 9 response is supplied to an anti-alias filter 10 that limits the bandwidth of the low-band I-F signal supplied to an analog-to-digital converter 11 for digitization. If the low-band I-F signal is no more than a few megahertz above zero frequency, the anti-alias filter 10 is a TBT RLC lowpass filter, for example. If the low-band I-F signal is in the HF range, the anti-alias filter 10 is a TBT RLC lowpass filter, a TBT RLC bandpass filter, or a SAW filter, by way of examples. The ADC 11 can be of a type that supplies indications of when its input signal exceeds a level that can be accurately digitized; such indications can be detected for generating AGC signal for controlling the gain of the low-band I-F amplifier 8.

The final I-F band is offset at least megahertz or so from baseband to facilitate the generation of complex digital signals in response to the final I-F signal. The ADC 11 supplies the digitized low-band I-F signal to a phase-splitter 12 that generates imaginary samples from those real samples of ADC 11 response received as input signal. The phase-splitter 12 also delays the real samples of ADC 11 response to be in correct temporal alignment with the generated imaginary samples of ADC 11 response, thereby to supply samples of digitized low-band I-F signal in digital complex-number format.

The phase-splitter 12 supplies these samples of digitized low-band I-F signal in digital complex-number format as multiplicand input signal to a complex digital multiplier 13 receiving its multiplier input signal from a source 14 of synchrodyning carrier wave in digital complex-number format. This source 14 of synchrodyning carrier wave typically includes read-only memory (ROM) storing sine and cosine look-up tables descriptive of the synchrodyning carrier wave in digital complex-number format. An address counter addresses the ROM with the count of oscillations supplied by a controlled clock oscillator not explicitly shown in FIG. 1.

FIG. 1 shows the multiplier 13 connected for supplying samples of the imaginary portion of the complex product output signal therefrom to a digital-to-analog converter 15. The DAC 15 is connected to apply its analog output signal to an automatic-frequency and phase control filter 16, the lowpass filter response of which filter 16 is applied to the second local oscillator 6 as an automatic frequency and phase control (AFPC) signal. This AFPC signal minimizes the imaginary low-frequency portion of the complex product output signal and maximizes the real low-frequency portion of the complex product output signal.

Channel-equalization filtering 17 receives, as input signal thereto, the samples of the real portion of the complex product output signal generated by the multiplier 13. The channel-equalization filtering 17 is connected for supplying equalized samples of the real portion of the complex product output signal from the multiplier 13 to trellis decoder circuitry 18. The trellis decoder circuitry 18 is designed for decoding symbol codes on a soft-decision basis using a Viterbi algorithm, for example. For details concerning one way to carry out such symbol decoding the reader is referred to U.S. Pat. No. 5,508,752 entitled "PARTIAL RESPONSE TRELLIS DECODER FOR HIGH DEFINITION TELEVISION (HDTV) SYSTEM" and issued to D. J. Kim, H. S. Kwak and H. J. Nam on Apr. 16, 1996.

The trellis decoder circuitry 18 supplies trellis coding results to byte de-interleaver circuitry 19. Byte de-interleaver circuitry 19 parses the trellis decoding results into bytes and performs diagonal byte interleaving over a prescribed portion of the data field to recover bytes of Reed-Solomon error-correction coding for application to Reed-Solomon decoder circuitry 20. Reed-Solomon decoding by the circuitry 20 generates an error-corrected byte stream supplied to a data de-randomizer 21. The data de-randomizer 21 supplies reproduced data to the remainder of the receiver (not shown). The remainder of a complete DTV receiver will include a packet sorter, an audio decoder, an MPEG-2 decoder and so forth. The remainder of a DTV signal receiver incorporated in a digital tape recorder/reproducer will include circuitry for converting the data to a form for recording.

The channel-equalization filtering 17 is adaptive, with at least some of its filter coefficients being subject to change as calculated by computation circuitry 22. The channel-equalization filtering 17 is presumed to employ the commonplace configuration that includes a finite-impulse-response (FIR) input filter and an infinite-impulse-response (IIR) output filter in cascade for equalizing the real portion of the complex product output signal from the multiplier 13. After channel equalization is achieved, decision-feedback techniques can be employed to maintain channel equalization despite changes in multipath conditions. A decision-feedback error detector 23 differentially combines signals from the channel-equalization filtering 17, which signals relate to the real portion of the channel-equalization filtering 17 output signal and to the real portion of the channel-equalization filtering 17 output signal as quantized for estimating the DTV signal actually transmitted. The error detector 23 supplies the resulting decision-feedback error signal to the computation circuitry 22 for implementing the decision-feedback techniques that are employed to maintain channel equalization despite changes in multipath conditions.

Decision-directed methods for adapting the channel-equalization filtering 17 are better implemented by including a companion digital filter in the computation circuitry 22. Such a procedure using a least-mean-squares (LMS) optimization procedure implemented on a block-sequential basis is described in U.S. Pat. No. 5,648,987 entitled "RAPID- UPDATE ADAPTIVE CHANNEL-EQUALIZATION FILTERING FOR DIGITAL RADIO RECEIVERS, SUCH AS HDTV RECEIVERS" issued Jul. 15, 1997 to J. Yang, C. B. Patel, T. Liu and A. L. R. Limberg. C. M. Zhao, X. Y. Hu and X. H. Yu indicate in their September 1998 paper "Block Sequential Least Squares Decision Feedback Equalization Algorithm with Application to Terrestrial HDTV Transmission" appearing in IEEE Transactions on Broadcasting, Vol. 44, No. 3, that using block-sequential LMS optimization procedures rather than continuous LMS optimization procedures permits a bit error rate of $3 \times 10^{-9}$ to be achieved with signals having 3.5 dB poorer signal-to-noise ratio.

Initialization of the filter coefficients channel-equalization filtering 17 is preferably done by evaluating a prescribed training signal that is time-division-multiplexed with the digital modulation at the transmitter and received together with multi-path distortion at the receiver. Circuitry 24 extracts the training signal from the data field synchronization (DFS) codes that appear in the initial data segments of data fields. Usually, the circuitry 24 is of a type for extracting the middle PN63 sequences from the DFS signals by differentially combining the initial data segments of the data fields within each data frame. Circuitry 25 separates the initial data segments of the data fields for the circuitry 24, responsive to control signals generated in response to symbol count furnished by a symbol counter within the circuitry 25. The symbol count furnished by the symbol counter is periodically reset to prescribed value responsive to particular portions of the DFS codes which portions are selected in most receiver designs so as to include the middle PN63 sequences of the DFS codes.

In order to evaluate the nature of multipath distortion, the computation circuitry 22 compares the prescribed training signal, as received by the receiver with multi-path distortion, with an ideal prescribed training signal free from multi-path distortion as stored at the receiver. The computation circuitry 22 has random-access memory (RAM) included therein for storing segments of the stream of digital samples of the real portion of the equalized baseband symbol coding supplied from the channel-equalization filtering 17, which segments contain the received training signal or ghosts thereof.

Especially if the differential delays between the principal received signal and its ghosts are not too long, discrete Fourier transform (DFT) methods can be used to initialize the kernel weights for the digital filtering in a very short time. The DFT of the prescribed training signal with multipath distortion as received by the receiver is calculated and divided by the DFT of the prescribed training signal to determine the DFT of the transmission channel, a process referred to as "characterizing the channel". The complement of the channel DFT describes the DFT the adaptive channel-equalization filtering 17 should have, and the kernel weights are determined accordingly. These calculations are carried out by a micro-processor with suitable software being included in the computation circuitry 22. The computation circuitry 22 can include read-only memory (ROM) for storing the DFT of the prescribed training signal. This saves having to calculate the DFT of the prescribed training signal from the prescribed training signal per se as stored and read from ROM.

If the differential delay between the principal received signal and a ghost thereof is substantial, several microseconds or tens of microseconds, a match filter for the training signal can be included in the computation circuitry 22 and used in conjunction with a microprocessor also included in the computation circuitry 22 for determining the differential delay and the relative magnitude of the ghost. This can speed up the calculation of kernel weights for filters which use programmable bulk delay between sparse groupings of taps that have non-zero weights.

The rate of sampling in the FIG. 1 DTV receiver system is preferably a multiple of symbol rate, which facilitates the operation of the channel-equalization filtering 17 as a fractional equalizer. In a fractional equalizer the tap intervals in the filter kernel can fall at intervals more closely spaced than symbols are spaced in the temporal regime. Fractional equalization, if properly done, facilitates the decision-feedback error detector generating error samples at rates sufficiently high to permit dynamic multipath conditions to be tracked.

Figure 2:
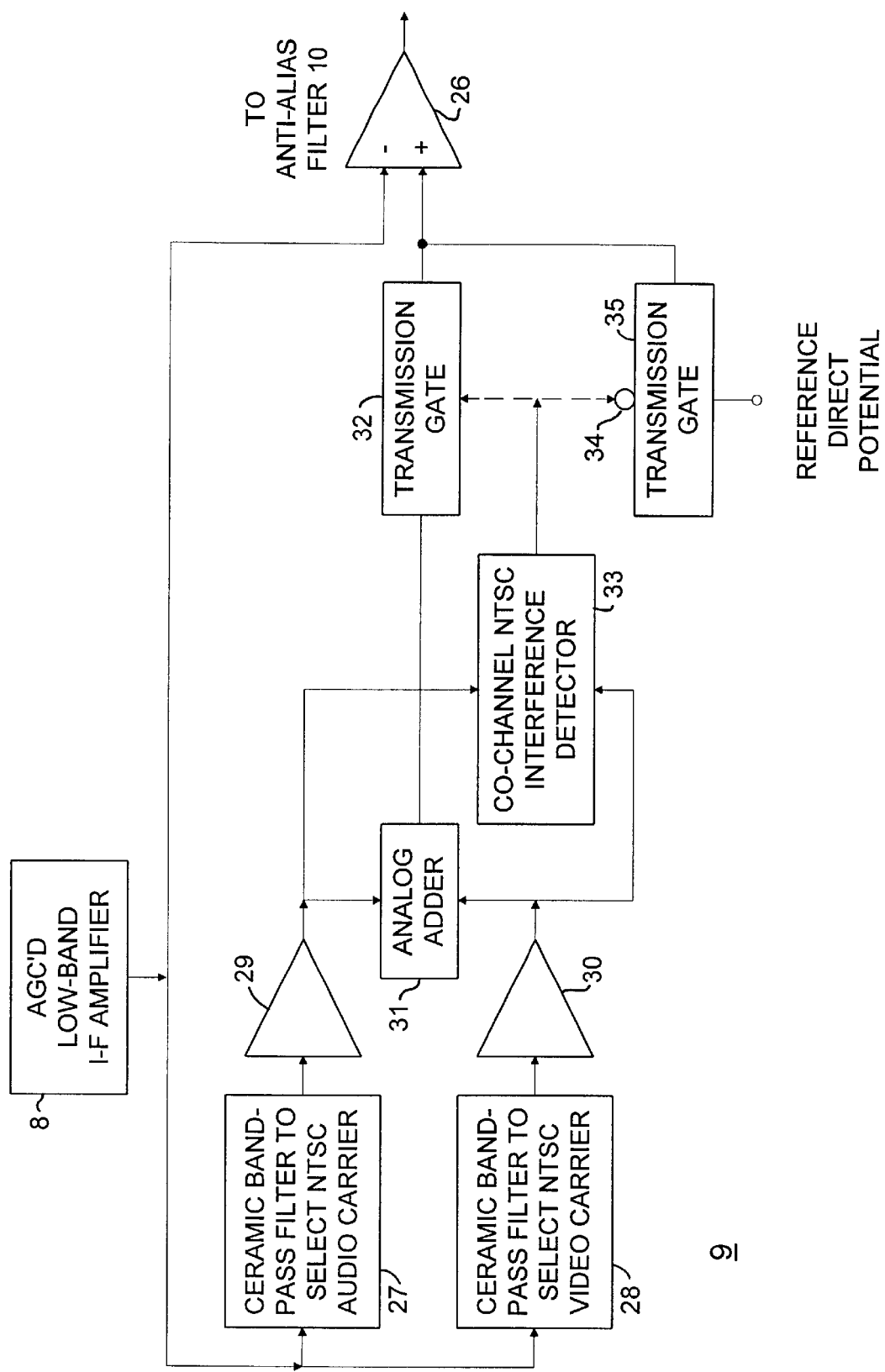
FIG. 2 is a schematic diagram of trap filtering for co-channel interfering NTSC analog television signal, which trap filtering is suitable for inclusion in the DTV signal receiver of FIG. 1.

FIG. 2 shows a construction for the trap filtering 9 to suppress portions of any co-channel interfering NTSC signal proximate the audio carrier or the video carrier, which construction is preferred for the ease with which the trap filtering can be disabled when there is no significant level of co-channel interfering NTSC signal. The low-band I-F amplifier 8 output signal is applied to the non-inverting input terminal of a differential-input amplifier 26, the low-band I-F output signal of which amplifier 26 drives the SAW filter 10 from the source impedance that the SAW filter 9 requires to provide its specified response. The low-band I-F amplifier 8 output signal is supplied to a ceramic bandpass filter 27, which selectively responds to a frequency range including the audio carrier of the co-channel interfering NTSC signal, and to a ceramic bandpass filter 28, which selectively responds to a frequency range including the video carrier of the co-channel interfering NTSC signal.

The frequency range to which the ceramic bandpass filter 27 selectively responds can, for example, extend about ±50 kilohertz each side of the audio carrier of the co-channel interfering NTSC signal as translated to the low-band final I-F band. By way of further example, the frequency range that the ceramic bandpass filter 27 selectively responds to can be extended somewhat further from the NTSC audio carrier towards the edge of the reception channel closest by the NTSC audio carrier.

The frequency range to which the ceramic bandpass filter 28 selectively responds should be within a frequency range substantially within a wider frequency range extending 896.9 to 978.4 kHz from DTV carrier as translated to the low-band final I-F band. This avoids the ceramic bandpass filter 28 response including any subharmonic of symbol rate, since the tenth and eleventh subharmonics respectively fall 978.4 kHz and 896.9 kHz from DTV carrier.

The ceramic bandpass filter 27 response is applied as input signal to a voltage amplifier 29, and the ceramic bandpass filter 28 response is applied as input signal to a voltage amplifier 30. An analog adder 31 sums the responses of the voltage amplifiers 29 and 30 to generate a sum signal that a transmission gate 32 selectively applies to the inverting input terminal of the differential-input amplifier 26. The voltage gain of the voltage amplifier 29 is chosen to compensate for insertion losses for the signal passed through the ceramic bandpass filter 27, the adder 31, and the conductive transmission gate 32. The voltage gain of the voltage amplifier 30 is chosen to compensate for insertion losses for the signal passed through the ceramic bandpass filter 28, the adder 31, and the conductive transmission gate 32.

The transmission gate 32 is rendered conductive by a co-channel NTSC interference detector 33 supplying an indication that there is a co-channel interfering NTSC signal of enough energy to significantly affect data slicing and other symbol decoding procedures. The co-channel NTSC interference detector 33 can take a number of forms, but a preferred form multiplicatively mixes the responses of the ceramic bandpass filters 27 and 28 one with the other, which generates a continuous 4.5 MHz intercarrier signal whenever co-channel interfering NTSC signal is present in the low-band I-F amplifier 8 output signal. As a practical consideration, the 4.5 MHz intercarrier signal is not generated when only DTV signal is being received. A bandpass filter selects the 4.5 MHz intercarrier signal for envelope detection, and the envelope detection result is threshold detected for determining whether or not a 4.5 MHz intercarrier signal of significant energy results from multiplicatively mixing the responses of the ceramic bandpass filters 27 and 28 one with the other.

The co-channel NTSC interference detector 33 indications are supplied to a logic inverter 34, the response of which controls transmission through a transmission gate 35. The transmission gate 35 is rendered non-conductive when the co-channel NTSC interference detector 33 supplies an indication that there is a co-channel interfering NTSC signal of enough energy to significantly affect data slicing and other symbol decoding procedures. The concurrent conduction of the transmission gate accordingly 32 applies to the inverting input terminal of the differential-input amplifier 26 a signal corresponding to the portions of the low-band I-F amplifier 8 output signal in the frequency regions near the NTSC audio carrier and near the NTSC video carrier. Shimming delay is included in the FIG. 2 circuitry so that the low-band I-F amplifier 8 output signal applied to the non-inverting input terminal of the differential-input amplifier 26 is delayed similarly to the responses of the responses of the ceramic bandpass filters 27 and 28 as selectively applied to the inverting input terminal of the differential-input amplifier 26. Accordingly, the differential-input amplifier 26 exhibits suppressed response to the portions of the low-band I-F amplifier 8 output signal in the frequency regions near the NTSC audio carrier and near the NTSC video carrier, as compared to the response to other portions of the low-band I-F amplifier 8 output signal.

The transmission gate 32 is rendered non-conductive by the co-channel NTSC interference detector 33 supplying an indication that there is no co-channel interfering NTSC signal with enough energy to significantly affect data slicing and other symbol decoding procedures. This indication renders the transmission gate 35 conductive to apply a reference direct potential to the inverting input terminal of the differential-input amplifier 26. Accordingly, the differential-input amplifier 26 exhibits response to the entire low-band I-F amplifier 8 output signal. That is, if there is no co-channel interfering NTSC signal with enough energy to significantly affect data slicing and other symbol decoding procedures, the DTV signal is not subjected to trap filtering.

Figure 3:
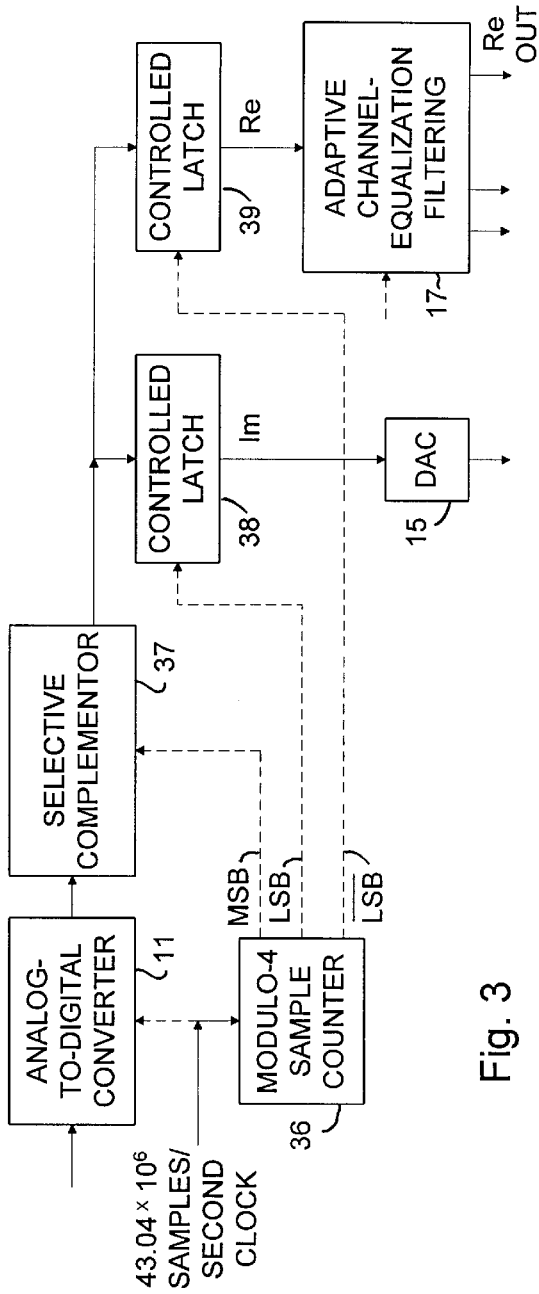
FIG. 3 is a schematic diagram of alternative digital demodulation circuitry that can be used in a modification of the DTV signal receiver of FIG. 1 when the carrier frequency of the final intermediate-frequency signal in hertz is the same value as the number of symbols per second in the received DTV signal.

FIG. 3 shows alternative digital demodulation circuitry that can be used for replacing elements 12, 13 and 14 in a modification of the FIG. 1 DTV signal receiver, providing that the carrier of the final I-F signal is at 10.76 MHz. A system sampling clock is supplied to the analog-to-digital converter 11 for sampling the low-band I-F signal at a 43.04 million samples per second rate and digitizing each sample. The 43.04 million samples per second system sampling clock is supplied as count input signal to a modulo-4 sample counter 36. The counter 36 is a binary counter supplying a more significant bit of modulo-4 sample count, a less significant bit of modulo-4 sample count, and the complements of these bits.

The samples of digitized low-band I-F signal that the ADC 11 supplies as its output signal are applied as input signal to a selective complementor 37. Responsive to the more significant bit of modulo-4 sample count being a ZERO, the selective complementor 37 reproduces its input signal in its output signal. Responsive to the more significant bit of modulo-4 count being a ONE, the selective complementor 37 generates the negative of its input signal in its output signal.

Each time that the less significant bit of modulo-4 sample count becomes ONE, a controlled latch 38 responds to store the current selective complementor 37 output signal for two system sampling epochs, which operation of the FIG. 3 demodulation circuitry supplies imaginary samples of demodulated final I-F signal at a 21.52 million samples per second rate to the DAC 15. Each time that the bit complement of the less significant bit of modulo-4 sample count becomes ONE, a controlled latch 39 responds to store the current selective complementor 37 output signal for two system sampling epochs, which operation of the FIG. 3 demodulation circuitry supplies real samples of demodulated final I-F signal at a 21.52 million samples per second rate to the adaptive channel-equalization filtering 17.

The 21.52 million samples per second stream the controlled latch 39 supplies the channel-equalization filtering 17 is suited for operating the component filters therein to perform fractional equalization with kernel taps spaced at intervals of one-half of a symbol epoch. Performing fractional equalization with kernel taps spaced at intervals of one-half a symbol epoch doubles the number of coefficients of the channel-equalization filtering 17 required to cancel ghosts of a prescribed delay (e. g., 40 microseconds), as compared to the number of coefficients required for synchronous equalization.

Alternatively, the 21.52 million samples per second stream the controlled latch 39 supplies can readily be re-sampled to 43.04 million samples per second rate, so the component filters included in the channel-equalization filtering 17 can be operated to perform fractional equalization with kernel taps spaced at intervals of three-quarters a symbol epoch. Performing fractional equalization with kernel taps spaced at intervals of three-quarters of a symbol epoch reduces the number of coefficients of the channel-equalization filtering 17 required to cancel ghosts of a prescribed delay (e. g., 40 microseconds) to only four thirds as many as required for synchronous equalization.

In another alternative the 21.52 million samples per second stream the controlled latch 39 supplies is re-sampled to 64.56 million samples per second rate, so the component filters included in the channel-equalization filtering 17 can be operated to perform fractional equalization with kernel taps spaced at intervals of five-sixths a symbol epoch. Performing fractional equalization with kernel taps spaced at intervals of seven-eighths of a symbol epoch reduces the number of coefficients of the channel-equalization filtering 17 required to cancel ghosts of a prescribed delay (e. g., 40 microseconds) to only six fifths as many as required for synchronous equalization.

In still another alternative the 21.52 million samples per second stream the controlled latch 39 supplies is re-sampled to 86.08 million samples per second rate, so the component filters included in the channel-equalization filtering 17 can be operated to perform fractional equalization with kernel taps spaced at intervals of seven-eighths a symbol epoch. Performing fractional equalization with kernel taps spaced at intervals of seven-eighths of a symbol epoch reduces the number of coefficients of the channel-equalization filtering 17 required to cancel ghosts of a prescribed delay (e. g., 40 microseconds) to only eight sevenths as many as required for synchronous equalization.

Figure 4:
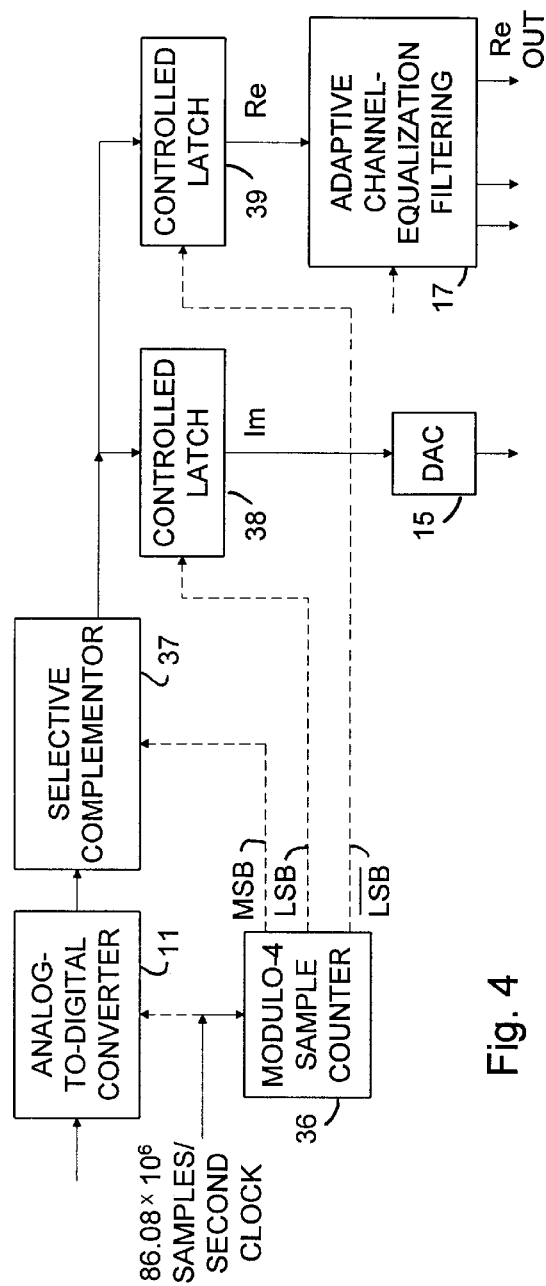
FIG. 4 is a schematic diagram of alternative digital demodulation circuitry that can be used in a modification of the DTV signal receiver of FIG. 1 when the carrier frequency of the final intermediate-frequency signal in hertz is the same value as twice the number of symbols per second in the received DTV signal.

FIG. 4 shows digital demodulation circuitry similar to that of FIG. 3, which FIG. 4 digital demodulation circuitry can be used for replacing elements 12, 13 and 14 in a modification of the FIG. 1 DTV signal receiver, providing that the carrier of the final I-F signal is at 21.52 MHz. Interestingly, using this 21.52 MHz final I-F carrier frequency and generating the final I-F signal so as to place this carrier at the lower frequency end of the final I-F signal frequency spectrum results in a final I-F signal located in that portion of the spectrum occupied by the I-F signal of VHF television receivers before UHF television broadcasting was instituted. The system sampling clock is supplied to the analog-to-digital converter 11 at a 86.08 million samples per second rate in FIG. 4. The 86.08 million samples per second system sampling clock is also supplied as count input signal to the modulo-4 sample counter 36.

The samples of digitized low-band I-F signal that the ADC 11 supplies as its output signal are applied as input signal to the selective complementor 37 in the FIG. 4 demodulation circuitry. Responsive to the more significant bit of modulo-4 sample count being a ZERO, the selective complementor 37 reproduces its input signal in its output signal. Responsive to the more significant bit of modulo-4 count being a ONE, the selective complementor 37 generates the negative of its input signal in its output signal.

Each time that the less significant bit of modulo-4 sample count becomes ONE, the controlled latch 38 responds to store the current selective complementor 37 output signal for two system sampling epochs, which operation of the FIG. 4 demodulation circuitry supplies imaginary samples of demodulated final I-F signal at a 43.04 million samples per second rate to the DAC 15. Each time that the bit complement of the less significant bit of modulo-4 sample count becomes ONE, a controlled latch 38 responds to store the current selective complementor 37 output signal for two system sampling epochs, which operation of the FIG. 4 demodulation circuitry supplies imaginary samples of demodulated final I-F signal at a 43.04 million samples per second rate to the adaptive channel-equalization filtering 17.

The 43.04 million samples per second stream the controlled latch 39 supplies the channel-equalization filtering 17 are suited for operating the filters therein to perform fractional equalization with kernel taps spaced at intervals of three-quarters of a symbol epoch. Alternatively, the 43.04 million samples per second stream the controlled latch 39 supplies can readily be re-sampled to 86.08 million samples per second rate so the component filters included in the channel-equalization filtering 17 can be operated to perform fractional equalization with kernel taps spaced at intervals of seven-eighths of a symbol epoch. Performing fractional equalization with kernel taps spaced at intervals of seven-eighths of a symbol epoch reduces the number of coefficients of the channel-equalization filtering 17 required to cancel ghosts of a prescribed delay (e. g., 40 microseconds) to only eight-sevenths as many as required for synchronous equalization.

The FIG. 1 DTV signal receiver can be operated with a final I-F band that overlaps the medium-frequency (MF) and high-frequency (HF) bands. The wide-band SAW filter 10 becomes more difficult to implement at lower frequencies, and insertion loss in the SAW filter 10 tends to be greater. The frequency of the DTV carrier is best selected to be a rational multiple of the rate of sampling in the system, so that sine and cosine look-up tables stored in ROM will exhibit proper wraparound when the address counter for the ROM rolls over its sample count. A rational multiple may be viewed as a vulgar fraction with numerator and denominator having respective integer values. To avoid aliasing a final I-F signal carrier below 5.38 MHz requires VSB modulation with most of its sideband energy above carrier frequency. A final I-F signal carrier of 5.38 MHz to about 6 MHz or so preferably has VSB modulation with most of its sideband energy above carrier frequency. A final I-F signal carrier of 6.15 MHz or more preferably has VSB modulation with most of its sideband energy below carrier frequency.

Using a system sampling rate that is twice symbol rate permits operation of the channel-equalization filtering 17 as a fractional equalizer in which adjacent weighted taps in the kernels of its component filters are spaced one-half of a symbol epoch apart. Such a fractional equalizer is suited for use with a final I-F carrier of 10.76 MHz, as noted previously in the description of the FIG. 3 demodulation circuitry. A final I-F carrier of 1.79 MHz, 1.96 MHz, 2.15 MHz, 2.39 MHz, 2.69 MHz, 3.07 MHz, 3.58 MHz, 4.03 MHz, 5.38 MHz or 7.17 MHz is also easily generated from ROM addressed from a sample counter counting samples at 21.52 million samples per second rate. I-F carrier at any one of these frequencies is sampled an integral number of times per cycle when sampling at 21.52 million samples per second rate.

Using a system sampling rate that is thrice symbol rate facilitates operation of the channel-equalization filtering 17 as a fractional equalizer in which adjacent weighted taps in the kernels of its component filters are spaced two -third s of a symbol epoch apart . A final I-F carrier of 1.79 MHz, 1.90 MHz, 2.02 MHz, 2.152 MHz, 2.31 MHz, 2.48 MHz, 2.69 MHz, 2.93 MHz, 3.23 MHz, 3.58 MHz, 4.04 MHz, 4.61 MHz, 5.38 MHz, 6.46 MHz or 8.07 MHz is easily generated from ROM addressed from a sample counter counting samples at 32.28 million samples per second rate. I-F carrier at any one of these frequencies is sampled an integral number of times per cycle when sampling at 32.28 million samples per second rate.

Using a system sampling rate that is four times symbol rate facilitates operation of the channel-equalization filtering 17 as a fractional equalizer in which adjacent weighted taps in the kernels of its component filters are spaced three-quarters of a symbol epoch apart. Such a fractional equalizer is suited for use with a final I-F carrier of 22.52 MHz, as noted previously in the description of the FIG. 4 demodulation circuitry. A final I-F carrier of 1.87 MHz, 2.04 MHz, 2.27 MHz, 2.53 MHz, 2.87 MHz, 3.31 MHz, 3.91 MHz, 4.78 MHz, 6.15 MHz, or 8.06 MHz is easily generated from ROM addressed from a sample counter counting samples at 43.04 million samples per second rate, in addition to the same carriers that are easily generated from ROM addressed from a sample counter counting samples at 21.52 million samples per second rate. I-F carrier at any one of these frequencies is sampled an integral number of times per cycle when sampling at 43.04 million samples per second rate.

Using a system sampling rate that is five times symbol rate facilitates operation of the channel-equalization filtering 17 as a fractional equalizer in which adjacent weighted taps in the kernels of its component filters are spaced four-fifths of a symbol epoch apart. Using a system sampling rate that is six times symbol rate facilitates operation of the channel-equalization filtering 17 as a fractional equalizer in which adjacent weighted taps in the kernels of its component filters are spaced five-sixths of a symbol epoch apart. Using a system sampling rate that is seven times symbol rate facilitates operation of the channel-equalization filtering 17 as a fractional equalizer in which adjacent weighted taps in the kernels of its component filters are spaced six-sevenths of a symbol epoch apart. Using a system sampling rate that is eight times symbol rate facilitates operation of the channel-equalization filtering 17 as a fractional equalizer in which adjacent weighted taps in the kernels of its component filters are spaced seven-eighths of a symbol epoch apart. These higher system sampling rates provide further choices of final I-F carrier frequency.

Figure 5:
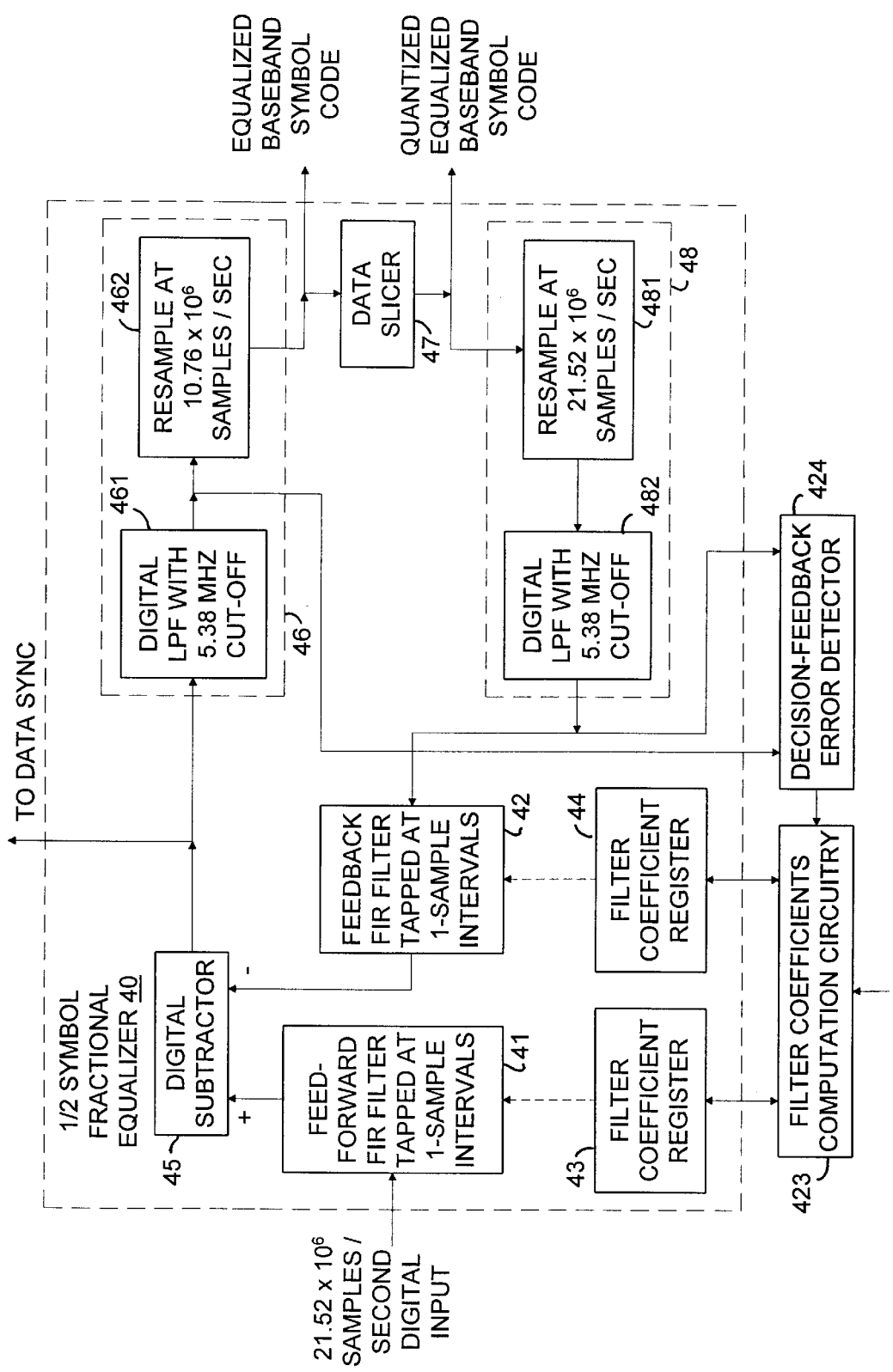
FIG. 5 is a schematic diagram of channel-equalization filtering that provides fractionally spaced equalization with one-half symbol epoch spacing between adjacent taps in the kernel of a component filter.

FIG. 5 shows a fractional equalizer 40 that is included in certain embodiments of the FIG. 1 channel-equalization filtering 17. Adjacent taps in the kernel of a component filter in the equalizer 40 have spacing therebetween which corresponds to one-half of a symbol epoch. The fractional equalizer 40 receives, as its input signal, the sample stream supplied at a 21,524,476 samples-per-second rate from the FIG. 1 complex multiplier 13 as the real part of its complex product output signal. Alternatively, if the FIG. 1 DTV signal receiver is modified per FIG. 2, the fractional equalizer 40 receives its input signal from the controlled latch 38. A feed-forward FIR filter 41 and a feedback FIR filter 42 included in the fractional equalizer 40 are clocked and operated at the 21,524,476 samples-per-second rate, which sample rate is twice symbol rate, and have taps at two-sample intervals corresponding to two-thirds of a symbol epoch. The filter coefficients for the FIR filter 41 are stored in a filter coefficient register 43 and are updated by a filter coefficients computation circuitry 423, which is a particular type of the FIG. 1 filter coefficients computation circuitry 22. The filter coefficients for the FIR filter 42 are stored in a filter coefficient register 44 and are also updated by the filter coefficients computation circuitry 423.

The fractional equalizer 40 further includes a digital subtractor 45 for differentially combining the responses from the FIR filters 41 and 42 at the 21,524,476 samples-per-second rate to supply equalized channel response in which equalization at band edges is improved over that obtainable using synchronous equalization. The difference output signal from the subtractor 45 is fed back to the input of the FIR filter 42, in a matter to be more particularly described infra. The resulting feedback loop incorporating the FIR filter 42 is operative as an infinite-impulse-response (IIR) filter used for suppressing multipath responses that appreciably lag the principal received DTV signal as demodulated to baseband. The feed-forward FIR filter 41 is used for suppressing multipath responses that lead the principal received DTV signal as demodulated to baseband. The feed-forward FIR filter 41 is also used for correcting errors in the amplitude and phase response of the reception channel introduced by the receiver or by multipath responses that slightly lead or lag the principal received DTV signal as demodulated to baseband.

The difference output signal from the subtractor 45 is supplied to a decimation filter 46 to be reduced in sampling rate to symbol rate, to facilitate estimation of the symbol as transmitted. The symbol that was transmitted to give rise to the current sample of the decimation filter 46 response is estimated by supplying that current sample to a data slicer 47. The estimates of the transmitted symbol that the data slicer 47 generates are noise-free and most of the time are correct. So, as known to persons skilled in the art of channel equalizer design, the adaptation of the channel-equalization filtering 17 by decision-feedback procedures will usually converge more rapidly to optimum values of weighting coefficients if the input signal for the feedback FIR filter 42 is generated from these estimates, rather than using the difference output signal from the subtractor 45 as input signal for the feedback FIR filter 42. An interpolation filter 48 is used for converting these estimates, as generated at symbol rate, to the system sampling rate used by the digital subtractor 45 and by the FIR filters 41 and 42 that supply the minuend and subtrahend input signals to the subtractor 45.

In the fractional equalizer 40 operated at 21,524,476 samples-per-second clockthrough rate, the feedback FIR filter 42 must have at least 861 samples of delay in order to suppress post-ghosts with up to 40 microsecond delay respective to principal received signal. The feed-forward FIR filter 41 must have at least 64 samples of delay in order to suppress pre-ghosts that lead the principal received signal up to 3 microseconds, but is usually designed to have twice as many samples in its kernel to facilitate equalization. One-symbol tap spacing in the filters 41 and 42 means that somewhere around 989 multipliers are used for applying the filter weights to the FIR filters 41 and 42 if straightforward design procedures are followed.

FIG. 5 shows the decimation filter 46 to include a finite-impulse-response digital lowpass filter 461 for restricting the bandwidth of the fractional equalizer 40 response and to includes a re-sampler (2:1 decimator) 462 for re-sampling the filter 461 response to 10,762,238 samples-per-second symbol rate for application to the quantizer 47. The digital lowpass filter 461 is designed to cooperate with filtering in the transmitter to provide a raised-cosine filter response rolling off 6 dB at 5.38 MHz. This restriction of the bandwidth of the fractional equalizer 40 response avoids inter-symbol interference (ISI) in the re-sampler 462 response supplied to the data slicer 47. The data slicer 47 response is a series of estimates of the symbols transmitted by the broadcaster. This series of estimates can be treated as an analog signal changing step value at one-symbol intervals, which equivalent analog signal has unlimited bandwidth when sampled at a multiple of symbol rate. This simplifies the construction of the interpolation filter 48. The response of the decimation filter 46 can be forwarded to trellis decoder circuitry 18 of soft-decision type, such as a Viterbi decoder, in the FIG. 1 DTV signal receiver. Or, the response of the data slicer 47 can be forwarded to trellis decoder circuitry 18 of hard-decision type.

FIG. 5 shows the interpolation filter 48 as including a re-sampler 481 for re-sampling the quantizer 47 response to 21,524,476 samples-per-second sampling rate and a finite-impulse-response digital lowpass filter 482 for restricting the bandwidth of the re-sampler 481 response. The interpolation filter 48 response is of appropriate 21,524,476 samples-per-second sampling rate for feeding back to the feedback FIR filter 44 of the fractional equalizer 40. The FIR digital lowpass filter 482 provides a raised-cosine filter response rolling off 6 dB at 5.38 MHz, so the estimated transmitted signal supplied from the filter 482 is suitable for comparison in a decision-feedback error detector 423 with the actual received signal supplied from the FIR digital lowpass filter 461.

The decision-feedback error detector 423 is a particular type of the FIG. 1 decision-feedback error detector 23. The FIR digital lowpass filter 461 response is delayed within the decision-feedback error detector 423 before the comparison with the FIR digital lowpass filter 482 response for generating decision-feedback error signal. The FIR digital lowpass filter 461 response is delayed before this comparison to compensate for the delays of the re-samplers 462 and 481, the delay of the quantizer 47, and difference in delays through the filters 461 and 482.

In a departure from the prior art the decision-feedback error detector 423 is clocked at the 21,524,476 samples-persecond rate in order to preserve the digital bandwidth that the error detector 23 requires for generating decision-feedback error signal at this sample rate. Generating decision-feedback error signal at this sample rate that is higher than symbol rate is desirable when fractional equalization is employed, because of the tap spacings in the FIR filters 41 and 42 being less than one symbol epoch. Generating decision-feedback error signal by comparing the data slicer 47 input and output signals at symbol rate introduces a restriction on the bandwidth of the decision-feedback error signal, considered as a system function, which restriction slows adaptation.

The difference output signal from the subtractor 45 is also supplied to data synchronization circuitry (not explicitly shown in FIG. 5). This data synchronization circuitry typically comprises match filtering for detecting data field synchronization (DFS) codes and match filtering for detecting data segment synchronization (DSS) codes, to facilitate the synchronization of a sample counter in the FIG. 1 circuitry 24 for extracting training signal from the initial data segments of data fields. This data synchronization circuitry can further include spectral line detection circuitry for selecting one-half the symbol frequency from the baseband symbol code to automatic frequency and phase control an oscillator that generates oscillations from which system sampling clock signals are derived.

The channel equalizer 40 of FIG. 5 can be modified to reduce by 430 or so the number of digital multipliers used therein, by replacing the feedback FIR filter 42 with a feedback FIR filter that is tapped at 2-sample intervals and has its tap weights calculated from decision feedback error detector 423 error signal as re-sampled to symbol rate. The modified structure is essentially a functional equivalent of the channel equalizer 40.

Figure 6:
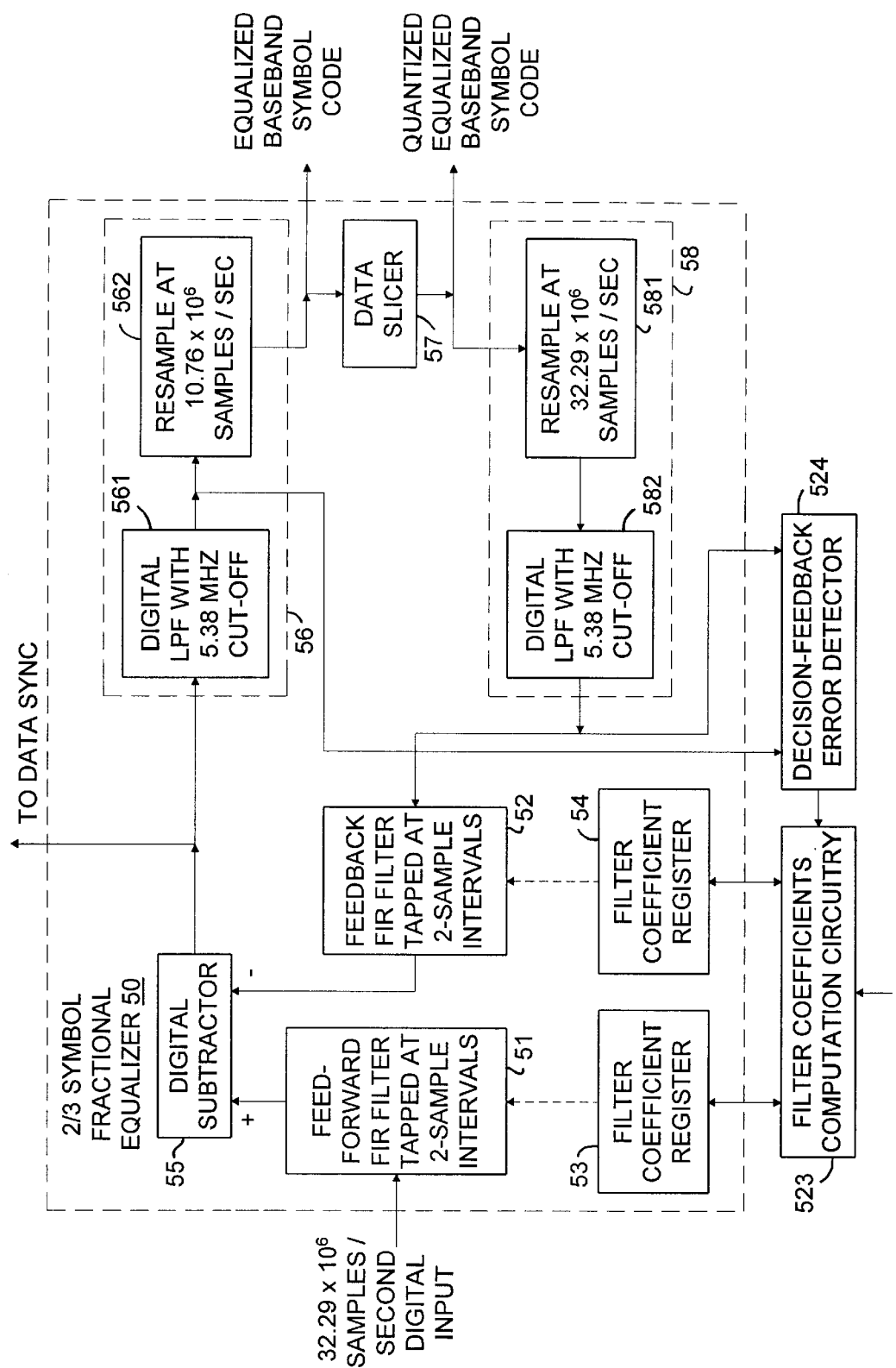
FIG. 6 is a schematic diagram of channel-equalization filtering that provides fractionally spaced equalization with two-thirds symbol epoch spacing between adjacent taps in the kernel of a component filter.

FIG. 6 shows a fractional equalizer 50 that is included in certain embodiments of the FIG. 1 channel-equalization filtering 17. Adjacent taps in the kernel of a component filter in the equalizer 50 have spacing therebetween which corresponds to two-thirds of a symbol epoch. The fractional equalizer 50 receives, as its input signal, the sample stream supplied at a 32,289,780 samples-per-second rate from the FIG. 1 complex multiplier 13 as the real part of its complex product output signal. A feed-forward FIR filter 51 and a feedback FIR filter 52 included in the fractional equalizer 50 are clocked and operated at the 32,289,780 samples-per-second clockthrough rate, which is three times symbol rate, and have taps at two-sample intervals corresponding to two-thirds of a symbol epoch. The filter coefficients for the FIR filter 51 are stored in a filter coefficient register 53 and are updated by the filter coefficients computation circuitry 523, which is a particular type of the FIG. 1 filter coefficients computation circuitry 22. The filter coefficients for the FIR filter 52 are stored in a filter coefficient register 54 and are also updated by the filter coefficients computation circuitry 523.

The fractional equalizer 50 further includes a digital subtractor 55 for differentially combining the responses from the FIR filters 51 and 52 at the 32,289,780 samples-per-second rate to furnish a difference output signal to a decimation filter 56. The decimation filter 56 reduces the sampling rate of the equalized channel response it receives from the subtractor 55 to symbol rate, to facilitate estimation of the symbol as transmitted. The symbol that was transmitted to give rise to the current sample of the decimation filter 56 response is estimated by supplying that current sample to a data slicer 57. The estimates of the transmitted symbol the data slicer 57 supplies at symbol rate are converted to 32,289,780 samples-per-second rate by an interpolation filter 58, to generate input signal for the feedback FIR filter 52. This closes a feedback loop incorporating the FIR filter 52, which loop operates as an IIR filter.

In the fractional equalizer 50 operated at 32,286,713 samples-per-second clockthrough rate, the feedback FIR filter 52 has to have 1291 samples of delay in order to suppress post-ghosts with up to 40 microsecond delay respective to principal received signal. The feed-forward FIR filter 51 must have at least 97 samples of delay in order to suppress pre-ghosts that lead the principal received signal up to 3 microseconds, but is usually designed to have twice as many samples in its kernel to facilitate equalization. Two-symbol tap spacing in the filters 51 and 52 means that somewhere around 1485 multipliers are used for applying the filter weights to the FIR filters 51 and 52 if straightforward design procedures are followed.

FIG. 6 shows the decimation filter 56 to include an FIR digital lowpass filter 561 for restricting the bandwidth of the fractional equalizer 50 response and to includes a re-sampler (3:1 decimator) 562 for re-sampling the filter 461 response to 10,762,238 samples-per-second symbol rate for application to the quantizer 57. The digital lowpass filter 561 is designed to cooperate with filtering in the transmitter to provide a raised-cosine filter response rolling off 6 dB at 5.38 MHz. This restriction of the bandwidth of the fractional equalizer 50 response avoids ISI in the re-sampler 562 response supplied to the data slicer 57. The data slicer 57 response is a series of estimates of the symbols transmitted by the broadcaster. The response of the decimation filter 56 can be forwarded to trellis decoder circuitry 18 of soft-decision type, such as a Viterbi decoder, in the FIG. 1 DTV signal receiver. Or, the response of the data slicer 57 can be forwarded to trellis decoder circuitry 18 of hard-decision type.

FIG. 6 shows the interpolation filter 58 as including a re-sampler 581 for re-sampling the quantizer 57 response to 32,286,713 samples-per-second sampling rate and an FIR digital lowpass filter 582 for restricting the bandwidth of the re-sampler 581 response. The interpolation filter 58 response is of appropriate 32,286,713 samples-per-second sampling rate for feeding back to the feedback FIR filter 54 of the fractional equalizer 50. The FIR digital lowpass filter 582 provides a raised-cosine filter response rolling off 6 dB at 5.38 MHz, so the estimated transmitted signal supplied from the filter 582 is suitable for comparison in a decision-feedback error detector 523 with the actual received signal supplied from the FIR digital lowpass filter 561.

The decision-feedback error detector 523 is a particular type of the FIG. 1 decision-feedback error detector 23 and is clocked at 32,286,713 samples-per-second rate. The decision-feedback error detector 523 delays the FIR digital lowpass filter 561 response before comparing it with the FIR digital lowpass filter 582 response to generate decision-feedback error signal. The FIR digital lowpass filter 561 response is delayed before this comparison to compensate for the delays of the re-samplers 562 and 581, the delay of the quantizer 57, and difference in delays through the filters 561 and 582.

The channel equalizer 50 of FIG. 6 can be modified to reduce by 215 or so the number of digital multipliers used therein, by replacing the feedback FIR filter 52 with a feedback FIR filter that is tapped at 3-sample intervals and has its tap weights calculated from decision feedback error detector 523 error signal as re-sampled to symbol rate. The modified structure is essentially a functional equivalent of the channel equalizer 50.

Figure 7:
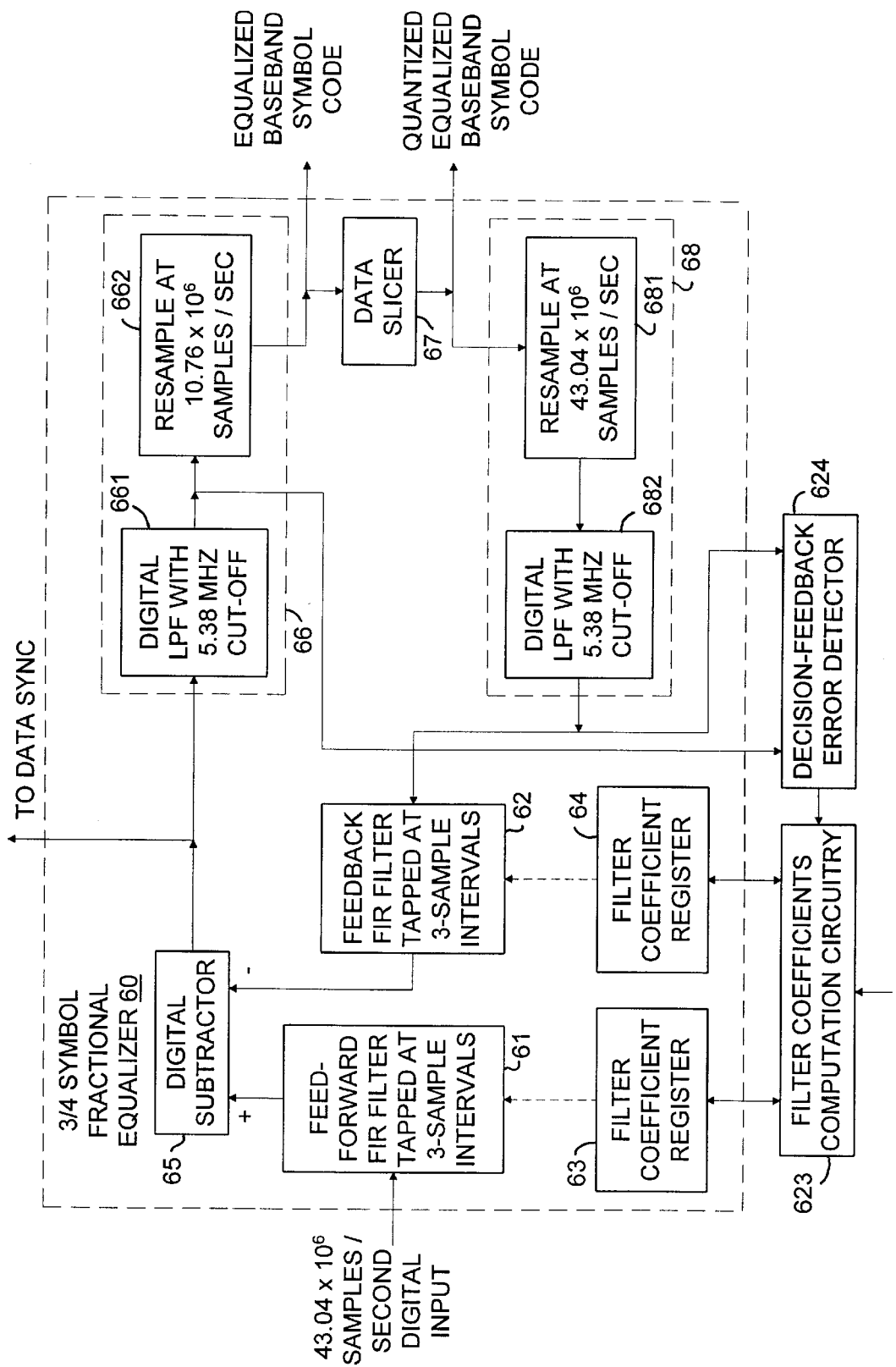
FIG. 7 is a schematic diagram of channel-equalization filtering that provides fractionally spaced equalization with three-fourths symbol epoch spacing between adjacent taps in the kernel of a component filter.

FIG. 7 shows a fractional equalizer 60 that is included in certain embodiments of the FIG. 1 channel-equalization filtering 17. Adjacent taps in the kernel of a component filter in the equalizer 60 have spacing therebetween which corresponds to three-quarters of a symbol epoch. The fractional equalizer 60 receives, as its input signal, the sample stream supplied at a 43,048,951 samples-per-second rate from the FIG. 1 complex multiplier 13 as the real part of its complex product output signal. Alternatively, if the FIG. 1 DTV signal receiver is modified per FIG. 4, the fractional equalizer 60 receives its input signal from the controlled latch 38. In another alternative, if the FIG. 1 DTV signal receiver is modified per FIG. 4, the fractional equalizer 60 receives its input signal from the controlled latch 38 as re-sampled to 43,048,951 samples-per-second rate by simply repeating each sample of latch 38 output signal twice. A feed-forward FIR filter 61 and a feedback FIR filter 62 included in the fractional equalizer 60 are clocked and operated at the 43,048,951 samples-per-second clockthrough rate, which is four times symbol rate, and have taps at three-sample intervals corresponding to three-fourths of a symbol epoch. The filter coefficients for the FIR filter 61 are stored in a filter coefficient register 63 and are updated by the filter coefficients computation circuitry 623, which is a particular type of the FIG. 1 filter coefficients computation circuitry 22. The filter coefficients for the FIR filter 62 are stored in a filter coefficient register 64 and are also updated by the filter coefficients computation circuitry 623.

The fractional equalizer 60 further includes a digital subtractor 65 for differentially combining the responses from the FIR filters 61 and 62 at the 43,048,951 samples-per-second rate to furnish a difference output signal to a decimation filter 66. The decimation filter 66 reduces the sampling rate of the equalized channel response it receives from the subtractor 65 to symbol rate, to facilitate estimation of the symbol as transmitted. The symbol that was transmitted to give rise to the current sample of the decimation filter 66 response is estimated by supplying that current sample to a data slicer 67. The estimates of the transmitted symbol the data slicer 67 supplies at symbol rate are converted to 43,048,951 samples-per-second rate by an interpolation filter 68, to generate input signal for the feedback FIR filter 62. This closes a feedback loop incorporating the FIR filter 62, which loop operates as an IIR filter.

In the fractional equalizer 60 operated at 43,048,951 samples-per-second clockthrough rate, the feedback FIR filter 62 has to have 1722 samples of delay in order to suppress post-ghosts with up to 40 microsecond delay respective to principal received signal. The feed-forward FIR filter 61 must have at least 129 samples of delay in order to suppress pre-ghosts that lead the principal received signal up to 3 microseconds, but is usually designed to have twice as many samples in its kernel to facilitate equalization. Three-symbol tap spacing in the filters 61 and 62 means that somewhere around 660 multipliers are used for applying the filter weights to the FIR filters 61 and 62 if straightforward design procedures are followed.

FIG. 7 shows the decimation filter 66 to include an FIR digital lowpass filter 661 for restricting the bandwidth of the fractional equalizer 60 response and to includes a re-sampler (4:1 decimator) 662 for re-sampling the filter 661 response to 10,762,238 samples-per-second symbol rate for application to the quantizer 67. The digital lowpass filter 661 is designed to cooperate with filtering in the transmitter to provide a raised-cosine filter response rolling off 6 dB at 5.38 MHz. This restriction of the bandwidth of the fractional equalizer 60 response avoids ISI in the re-sampler 662 response supplied to the data slicer 67. The data slicer 67 response is a series of estimates of the symbols transmitted by the broadcaster. The response of the decimation filter 66 can be forwarded to trellis decoder circuitry 18 of soft-decision type, such as a Viterbi decoder, in the FIG. 1 DTV signal receiver. Or, the response of the data slicer 67 can be forwarded to trellis decoder circuitry 18 of hard-decision type.

FIG. 7 shows the interpolation filter 68 as including a re-sampler 681 for re-sampling the quantizer 67 response to 43,048,951 samples-per-second sampling rate and an FIR digital lowpass filter 682 for restricting the bandwidth of the re-sampler 681 response. The interpolation filter 68 response is of appropriate 43,048,951 samples-per-second sampling rate for feeding back to the feedback FIR filter 64 of the fractional equalizer 60. The FIR digital lowpass filter 682 provides a raised-cosine filter response rolling off 6 dB at 5.38 MHz, so the estimated transmitted signal supplied from the filter 682 is suitable for comparison in a decision-feedback error detector 623 with the actual received signal supplied from the FIR digital lowpass filter 661.

The decision-feedback error detector 623 is a particular type of the FIG. 1 decision-feedback error detector 23 and is clocked at 43,048,951 samples-per-second rate. The decision-feedback error detector 623 delays the FIR digital lowpass filter 661 response before comparing it with the FIR digital lowpass filter 682 response to generate decision-feedback error signal. The FIR digital lowpass filter 661 response is delayed before this comparison to compensate for the delays of the re-samplers 662 and 681, the delay of the quantizer 67, and difference in delays through the filters 661 and 682.

The channel equalizer 60 of FIG. 7 can be modified to reduce by 146 or so the number of digital multipliers used therein, by replacing the feedback FIR filter 62 with a feedback FIR filter that is tapped at 4-sample intervals and has its tap weights calculated from decision feedback error detector 623 error signal as re-sampled to symbol rate. The modified structure is essentially a functional equivalent of the channel equalizer 60.

Figure 8:
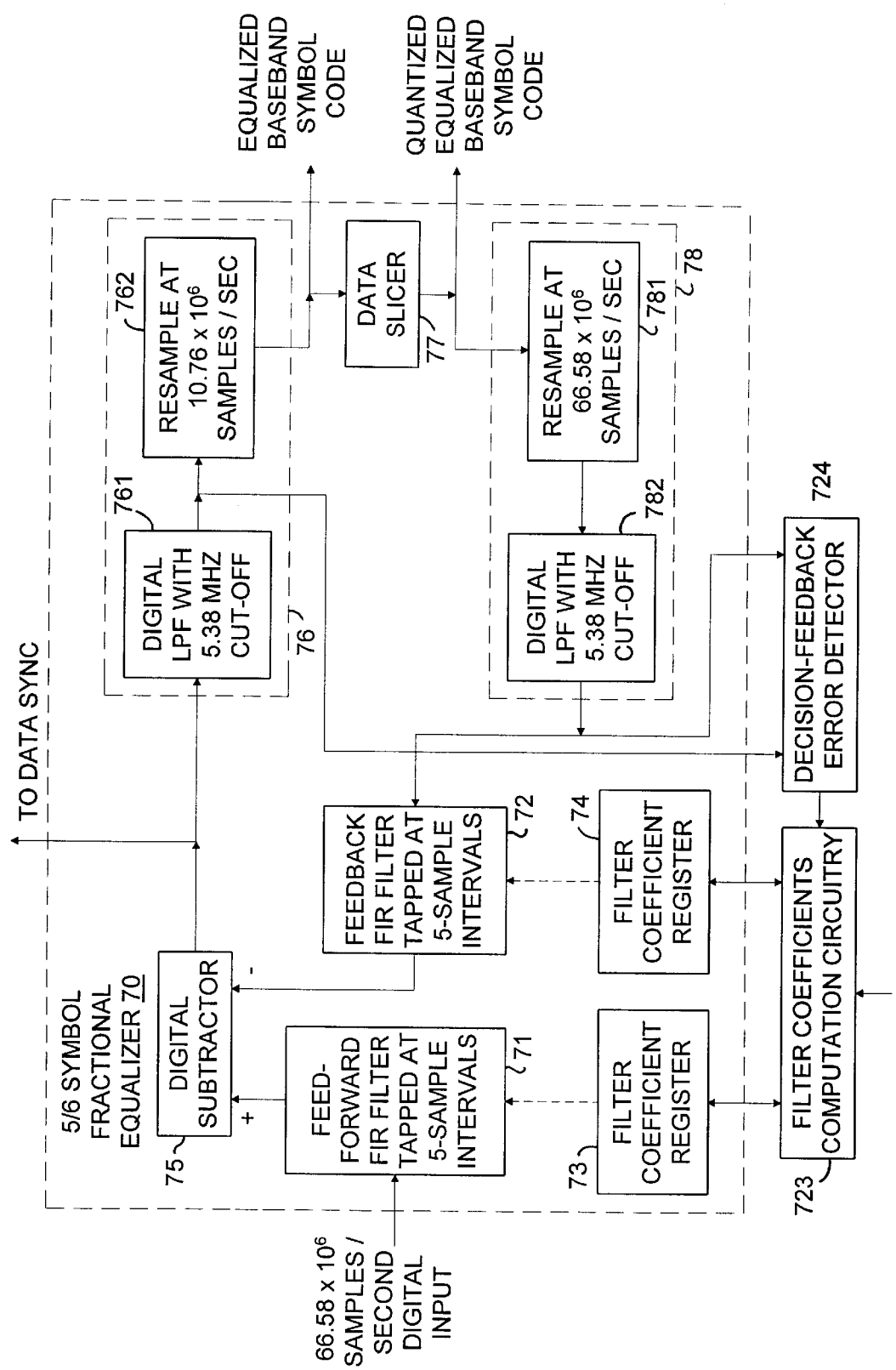
FIG. 8 is a schematic diagram of channel-equalization filtering that provides fractionally spaced equalization with five-sixths symbol epoch spacing between adjacent taps in the kernel of a component filter.

FIG. 8 shows a fractional equalizer 70 that is included in certain embodiments of the FIG. 1 channel-equalization filtering 17. Adjacent taps in the kernel of a component filter in the equalizer 70 have spacing therebetween which corresponds to five-sixths of a symbol epoch. The fractional equalizer 70 receives, as its input signal, the sample stream supplied at a 63,573,427 samples-per-second rate from the FIG. 1 complex multiplier 13 as the real part of its complex product output signal. Alternatively, if the FIG. 1 DTV signal receiver is modified per FIG. 3, the fractional equalizer 70 receives its input signal from the controlled latch 38 as re-sampled to 63,573,427 samples-per-second rate by simply repeating each sample of latch 38 output signal three times. A feed-forward FIR filter 71 and a feedback FIR filter 72 included in the fractional equalizer 70 are clocked and operated at the 63,573,427 samples-per-second clockthrough rate, which is six times symbol rate, and have taps at five-sample intervals corresponding to five-sixths of a symbol epoch. The filter coefficients for the FIR filter 71 are stored in a filter coefficient register 73 and are updated by the filter coefficients computation circuitry 723, which is a particular type of the FIG. 1 filter coefficients computation circuitry 22. The filter coefficients for the FIR filter 72 are stored in a filter coefficient register 74 and are also updated by the filter coefficients computation circuitry 723.

The fractional equalizer 70 further includes a digital subtractor 75 for differentially combining the responses from the FIR filters 71 and 72 at the 63,573,427 samples-per-second rate to furnish a difference output signal to a decimation filter 76. The decimation filter 76 reduces the sampling rate of the equalized channel response it receives from the subtractor 75 to symbol rate, to facilitate estimation of the symbol as transmitted. The symbol that was transmitted to give rise to the current sample of the decimation filter 76 response is estimated by supplying that current sample to a data slicer 77. The estimates of the transmitted symbol the data slicer 77 supplies at symbol rate are converted to 63,573,427 samples-per-second rate by an interpolation filter 78, to generate input signal for the feedback FIR filter 72. This closes a feedback loop incorporating the FIR filter 72, which loop operates as an IIR filter.

In the fractional equalizer 70 operated at 63,573,427 samples-per-second clockthrough rate, the feedback FIR filter 72 has to have 2583 samples of delay in order to suppress post-ghosts with up to 40 microsecond delay respective to principal received signal. The feed-forward FIR filter 71 must have at least 194 samples of delay in order to suppress pre-ghosts that lead the principal received signal up to 3 microseconds, but is usually designed to have twice as many samples in its kernel to facilitate equalization. Five-symbol tap spacing in the filters 71 and 72 means that somewhere around 593 multipliers are used for applying the filter weights to the FIR filters 71 and 72 if straightforward design procedures are followed.

FIG. 8 shows the decimation filter 76 to include a finite-impulse-response digital lowpass filter 761 for restricting the bandwidth of the fractional equalizer 70 response and to includes a re-sampler (6:1 decimator) 762 for re-sampling the filter 761 response to 10,762,238 samples-per-second symbol rate for application to the quantizer 77. The digital lowpass filter 761 is designed to cooperate with filtering in the transmitter to provide a raised-cosine filter response rolling off 6 dB at 5.38 MHz. This restriction of the bandwidth of the fractional equalizer 70 response avoids ISI in the re-sampler 762 response supplied to the data slicer 77. The data slicer 77 response is a series of estimates of the symbols transmitted by the broadcaster. The response of the decimation filter 76 can be forwarded to trellis decoder circuitry 18 of soft-decision type, such as a Viterbi decoder, in the FIG. 1 DTV signal receiver. Or, the response of the data slicer 77 can be forwarded to trellis decoder circuitry 18 of hard-decision type.

FIG. 8 shows the interpolation filter 78 as including a re-sampler 781 for re-sampling the quantizer 77 response to 63,573,427 samples-per-second rate and a FIR digital lowpass filter 782 for restricting the bandwidth of the re-sampler 781 response. The interpolation filter 78 response is of appropriate 63,573,427 samples-per-second sampling rate for feeding back to the feedback FIR filter 74 of the fractional equalizer 70. The FIR digital lowpass filter 782 provides a raised-cosine filter response rolling off 6 dB at 5.38 MHz, so the estimated transmitted signal supplied from the filter 782 is suitable for comparison in a decision-feedback error detector 723 with the actual received signal supplied from the FIR digital lowpass filter 761.

The decision-feedback error detector 723 is a particular type of the FIG. 1 decision-feedback error detector 23 and is clocked at 63,573,427 samples-per-second rate. The decision-feedback error detector 723 delays the FIR digital lowpass filter 761 response before comparing it with the FIR digital lowpass filter 782 response to generate decision-feedback error signal. The FIR digital lowpass filter 761 response is delayed before this comparison to compensate for the delays of the re-samplers 762 and 781, the delay of the quantizer 77, and difference in delays through the filters 761 and 782.

The channel equalizer 70 of FIG. 8 can be modified to reduce by 86 or so the number of digital multipliers used therein, by replacing the feedback FIR filter 72 with a feedback FIR filter that is tapped at 6-sample intervals and has its tap weights calculated from decision feedback error detector 723 error signal as re-sampled to symbol rate. The modified structure is essentially a functional equivalent of the channel equalizer 70.

Figure 9:
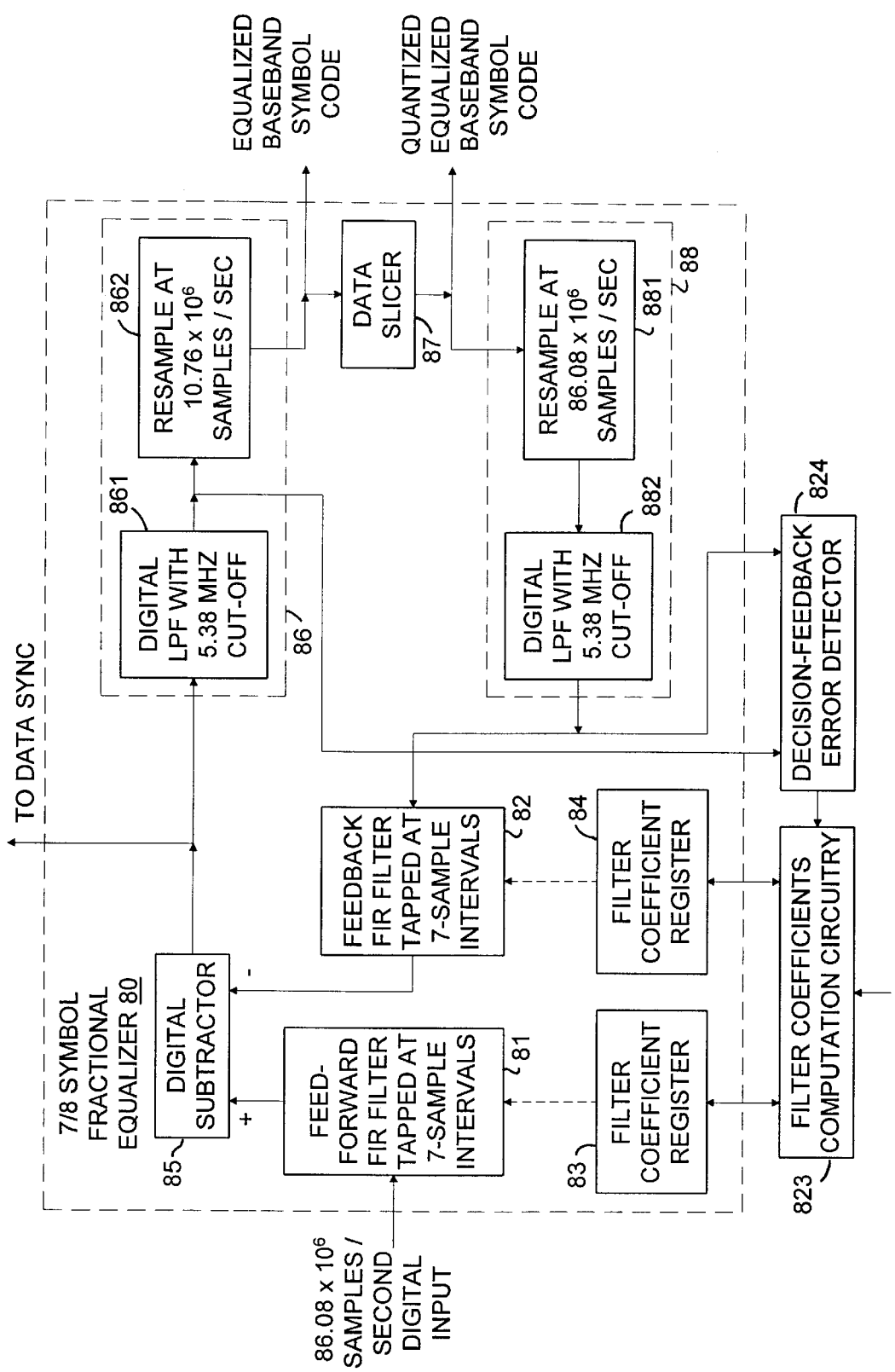
FIG. 9 is a schematic diagram of channel-equalization filtering that provides fractionally spaced equalization with seven-eighths symbol epoch spacing between adjacent taps in the kernel of a component filter.

FIG. 9 shows a fractional equalizer 80 that is included in certain embodiments of the FIG. 1 channel-equalization filtering 17. Adjacent taps in the kernel of a component filter in the equalizer 80 have spacing therebetween which corresponds to seven-eighths of a symbol epoch. The fractional equalizer 80 receives, as its input signal, the sample stream supplied at a 86,097,902 samples-per-second rate from the FIG. 1 complex multiplier 13 as the real part of its complex product output signal. Alternatively, if the FIG. 1 DTV signal receiver is modified per FIG. 3 or 4, the fractional equalizer 80 receives its input signal from the controlled latch 38 as re-sampled to 86,097,902 samples-per-second rate by simply repeating each sample of latch 38 output signal four times or two times. A feed-forward FIR filter 81 and a feedback FIR filter 82 included in the fractional equalizer 80 are clocked and operated at the 386,097,902 samples-per-second clockthrough rate, which is eight times symbol rate, and have taps at seven-sample intervals corresponding to seven-eighths of a symbol epoch. The filter coefficients for the FIR filter 81 are stored in a filter coefficient register 83 and are updated by the filter coefficients computation circuitry 823, which is a particular type of the FIG. 1 filter coefficients computation circuitry 22. The filter coefficients for the FIR filter 82 are stored in a filter coefficient register 84 and are also updated by the filter coefficients computation circuitry 823.

The fractional equalizer 80 further includes a digital subtractor 85 for differentially combining the responses from the FIR filters 81 and 82 at the 86,097,902 samples-per-second rate to furnish a difference output signal to a decimation filter 86. The decimation filter 86 reduces the sampling rate of the equalized channel response it receives from the subtractor 85 to symbol rate, to facilitate estimation of the symbol as transmitted. The symbol that was transmitted to give rise to the current sample of the decimation filter 86 response is estimated by supplying that current sample to a data slicer 87. The estimates of the transmitted symbol the data slicer 57 supplies at symbol rate are converted to 86,097,902 samples-per-second rate by an interpolation filter 88, to generate input signal for the feedback FIR filter 82. This closes a feedback loop incorporating the FIR filter 82, which loop operates as an IIR filter.

In the fractional equalizer 80 operated at 86,097,902 samples-per-second clockthrough rate, the feedback FIR filter 82 has to have 3444 samples of delay in order to suppress post-ghosts with up to 40 microsecond delay respective to principal received signal. The feed-forward FIR filter 81 must have at least 258 samples of delay in order to suppress pre-ghosts that lead the principal received signal up to 3 microseconds, but is usually designed to have twice as many samples in its kernel to facilitate equalization. Seven-symbol tap spacing in the filters 81 and 82 means that somewhere around 566 multipliers are used for applying the filter weights to the FIR filters 81 and 82 if straightforward design procedures are followed.

FIG. 9 shows the decimation filter 86 to include an FIR digital lowpass filter 861 for restricting the bandwidth of the fractional equalizer 80 response and to includes a re-sampler (8:1 decimator) 862 for re-sampling the filter 861 response to 10,762,238 samples-per-second symbol rate for application to the quantizer 87. The digital lowpass filter 861 is designed to cooperate with filtering in the transmitter to provide a raised-cosine filter response rolling off 6 dB at 5.38 MHz. This restriction of the bandwidth of the fractional equalizer 80 response avoids ISI in the re-sampler 862 response supplied to the data slicer 87. The data slicer 87 response is a series of estimates of the symbols transmitted by the broadcaster. The response of the decimation filter 86 can be forwarded to trellis decoder circuitry 18 of soft-decision type, such as a Viterbi decoder, in the FIG. 1 DTV signal receiver. Or, the response of the data slicer 87 can be forwarded to trellis decoder circuitry 18 of hard-decision type.

FIG. 9 shows the interpolation filter 88 as including a re-sampler 881 for re-sampling the quantizer 87 response to 86,097,902 samples-per-second rate and an FIR digital lowpass filter 882 for restricting the bandwidth of the re-sampler 881 response. The interpolation filter 88 response is of appropriate 386,097,902 samples-per-second rate for feeding back to the feedback FIR filter 84 of the fractional equalizer 80. The FIR digital lowpass filter 882 provides a raised-cosine filter response rolling off 6 dB at 5.38 MHz, so the estimated transmitted signal supplied from the filter 882 is suitable for comparison in a decision-feedback error detector 823 with the actual received signal supplied from the FIR digital lowpass filter 861.

The decision-feedback error detector 823 is a particular type of the FIG. 1 decision-feedback error detector 23 and is clocked at 86,097,902 samples-per-second rate. The decision-feedback error detector 823 delays the FIR digital lowpass filter 861 response before comparing it with the FIR digital lowpass filter 882 response to generate decision-feedback error signal. The FIR digital lowpass filter 861 response is delayed before this comparison to compensate for the delays of the re-samplers 862 and 881, the delay of the quantizer 87, and difference in delays through the filters 861 and 882.

The channel equalizer 80 of FIG. 9 can be modified to reduce by 61 or so the number of digital multipliers used therein, by replacing the feedback FIR filter 82 with a feedback FIR filter that is tapped at 8-sample intervals and has its tap weights calculated from decision feedback error detector 823 error signal as re-sampled to symbol rate. The modified structure is essentially a functional equivalent of the channel equalizer 80.

Considering the examples of fractional equalizer described above, the general design rule is that the feed-forward FIR filter thereof has a taps at an interval (M−1) times sample interval when the sample interval is (1/M) symbol interval, owing to the system sample rate being symbol rate times an integer M more than one. The fractional interval is then (M-1)/M times the synchronous interval corresponding to a symbol epoch. Such fractional interval most closely approximates the synchronous interval for a given system sample rate while giving the small amount of excess bandwidth one desires to permit adaptation to progress at suitable rate.

What is claimed is:

1. A plural-conversion digital television signal receiver comprising:

tuner and first converter apparatus for converting a digital television signal selected for reception to an initial intermediate-frequency signal in the ultra-high-frequency band;

a first intermediate-frequency amplifier connected to receive said initial intermediate-frequency signal from said tuner and first converter apparatus, said first intermediate-frequency amplifier for generating an amplified ultra-high-frequency intermediate-frequency signal responsive to said initial intermediate-frequency signal;

a second converter connected to receive said amplified ultra-high-frequency intermediate-frequency signal from said first intermediate-frequency amplifier, said second converter for converting said amplified ultra-high-frequency intermediate-frequency signal in a single conversion to a final intermediate-frequency signal and its image, said final intermediate-frequency signal being a low-band intermediate-frequency signal with the uppermost frequency thereof in the high-frequency band;

an image-rejection filter connected to receive said final intermediate-frequency signal and its image, said image-rejection filter for selecting said final intermediate-frequency signal in its frequency-selective response;

a gain-controlled second intermediate-frequency amplifier connected to receive the frequency-selective response of said image-rejection filter, said second intermediate-frequency amplifier for generating an amplified low-band intermediate-frequency signal responsive to the received response of said image-rejection filter;

analog-to-digital conversion circuitry connected for digitizing said amplified low-band intermediate-frequency signal to generate a digitized amplified low-band intermediate-frequency signal; and digital demodulating circuitry connected for demodulating said digitized amplified low-band intermediate-frequency signal.

2. The digital television signal receiver of claim 1, wherein said digital demodulating circuitry is of a type that provides complex demodulation of said digitized amplified low-band intermediate-frequency signal for generating a stream of real samples of a complex baseband signal and a stream of imaginary samples of said complex baseband signal, and wherein said second converter comprises a local oscillator for generating local oscillations of a frequency and phase that are controlled in response to an automatic frequency and phase control signal derived from said stream of imaginary samples of said complex baseband signal; and wherein said second converter further comprises a mixer for heterodyning said local oscillations with said amplified ultra-high-frequency intermediate-frequency signal from said first intermediate-frequency amplifier, thereby to generate said final intermediate-frequency signal and its image.

3. The digital television signal receiver of claim 2, wherein said digital demodulating circuitry comprises:

a complex digital multiplier, responsive to a complex multiplicand input signal applied thereto and to a complex multiplier input signal applied thereto, for supplying a complex product output signal composed of said stream of real samples of said complex baseband signal and said stream of imaginary samples of said complex baseband signal;

a phase-splitter connected to receive said digitized amplified low-band intermediate-frequency signal supplied from said analog-to-digital conversion circuitry and to supply said complex multiplicand input signal to said complex digital multiplier; and a source of complex digital carrier applied to said complex digital multiplier as said complex multiplier input signal.

4. The digital television signal receiver of claim 2, wherein said local oscillator is of a type for generating local oscillations of such frequency said final intermediate-frequency signal has a carrier frequency with the same number of cycles per second as the number of symbols per second in said digital television signal selected for reception; wherein said analog-to-digital conversion circuitry is of a type for digitizing said amplified low-band intermediate-frequency signal to generate a digitized amplified low-band intermediate-frequency signal sampled substantially four times per cycle of its carrier frequency; and wherein said digital demodulating circuitry comprises:

a counter connected for counting samples of said digitized amplified low-band intermediate-frequency signal to generate a modulo-four binary count thereof;

a selective complementor connected for generating a selective complementor response, by responding to the more significant bit of said modulo-four binary count having a first of two values thereof to complement said digitized amplified low-band intermediate-frequency signal in said selective complementor response thereto and thereby reverse the polarity of its system function, and by responding to said more significant bit of said modulo-four binary count having a second of said two values thereof to repeat said digitized amplified low-band intermediate-frequency signal in said selective complementor response thereto and thereby leave the polarity of its system function unchanged;

a first controlled latch connected for selecting said stream of real samples of a complex baseband signal from said selective complementor response, by responding to the less significant bit of said modulo-four binary count assuming a first of two values thereof to latch a current sample from said selective complementor response; and a second controlled latch connected for selecting said stream of real samples of a complex baseband signal from said selective complementor response, by responding to said less significant bit of said modulo-four binary count assuming a second of two values thereof to latch a current sample from said selective complementor response.

5. The digital television signal receiver of claim 2, wherein said local oscillator is of a type for generating local oscillations of such frequency said final intermediate-frequency signal has a carrier frequency with a number of cycles per second that is an integer multiple of the number of symbols per second in said digital television signal selected for reception; wherein said analog-to-digital conversion circuitry is of a type for digitizing said amplified low-band intermediate-frequency signal to generate a digitized amplified low-band intermediate-frequency signal sampled substantially four times per cycle of its carrier frequency; and wherein said digital demodulating circuitry comprises:

a counter connected for counting samples of said digitized amplified low-band intermediate-frequency signal to generate a modulo-four binary count thereof;

a selective complementor connected for generating a selective complementor response, by responding to the more significant bit of said modulo-four binary count having a first of two values thereof to complement said digitized amplified low-band intermediate-frequency signal in said selective complementor response thereto and thereby reverse the polarity of its system function, and by responding to said more significant bit of said modulo-four binary count having a second of said two values thereof to repeat said digitized amplified low-band intermediate-frequency signal in said selective complementor response thereto and thereby leave the polarity of its system function unchanged;

a first controlled latch connected for selecting said stream of real samples of a complex baseband signal from said selective complementor response, by responding to the less significant bit of said modulo-four binary count assuming a first of two values thereof to latch a current sample from said selective complementor response; and a second controlled latch connected for selecting said stream of real samples of a complex baseband signal from said selective complementor response, by responding to said less significant bit of said modulo-four binary count assuming a second of two values thereof to latch a current sample from said selective complementor response.

6. The digital television signal receiver of claim 5, wherein said local oscillator is of a type for generating local oscillations of such frequency said final intermediate-frequency signal has a carrier frequency with a number of cycles per second that is twice the number of symbols per second in said digital television signal selected for reception.

7. The digital television signal receiver of claim 2, further comprising:

adaptive channel-equalization circuitry connected for equalizing said stream of real samples of said complex baseband signal to generate a stream of equalized real samples of said complex baseband signal and for equalizing said stream of imaginary samples of said complex baseband signal to generate a stream of equalized imaginary samples of said complex baseband signal; and circuitry responsive to said stream of equalized imaginary samples of said complex baseband signal for generating said automatic frequency and phase control signal applied to said local oscillator for controlling the frequency and phase of the local oscillations generated thereby.

8. The digital television signal receiver of claim 7, wherein said digital demodulating circuitry comprises:

a complex digital multiplier, responsive to a complex multiplicand input signal applied thereto and to a complex multiplier input signal applied thereto, for supplying a complex product output signal composed of said stream of real samples of said complex baseband signal and said stream of imaginary samples of said complex baseband signal;

a phase-splitter connected to receive said digitized amplified low-band intermediate-frequency signal supplied from said analog-to-digital conversion circuitry and to supply said complex multiplicand input signal to said complex digital multiplier; and a source of complex digital carrier applied to said complex digital multiplier as said complex multiplier input signal.

9. The digital television signal receiver of claim 8, wherein said analog-to-digital conversion circuitry generates said digitized amplified low-band intermediate-frequency signal at a sample rate that is M times the symbol rate of said digital television signal selected for reception, M being an integer more than one; wherein said local oscillator is of a type for generating local oscillations of such frequency said final intermediate-frequency signal has a carrier frequency with a number of cycles per second that is an rational multiple, M/N, of the number of symbols per second in said digital television signal selected for reception, N being a positive integer; and wherein said adaptive channel-equalization circuitry employs fractional equalization with adjoining kernel taps separated intervals each corresponding to (M−1)/M times a symbol epoch.

10. The digital television signal receiver of claim 7 wherein said local oscillator is of a type for generating local oscillations of such frequency said final intermediate-frequency signal has a carrier frequency with the same number of cycles per second as the number of symbols per second in said digital television signal selected for reception; wherein said analog-to-digital conversion circuitry is of a type for digitizing said amplified low-band intermediate-frequency signal to generate a digitized amplified low-band intermediate-frequency signal sampled substantially four times per cycle of its carrier frequency; and wherein said digital demodulating circuitry comprises:

a counter connected for counting samples of said digitized amplified low-band intermediate-frequency signal to generate a modulo-four binary count thereof;

a selective complementor connected for generating a selective complementor response, by responding to the more significant bit of said modulo-four binary count having a first of two values thereof to complement said digitized amplified low-band intermediate-frequency signal in said selective complementor response thereto and thereby reverse the polarity of its system function, and by responding to said more significant bit of said modulo-four binary count having a second of said two values thereof to repeat said digitized amplified low-band intermediate-frequency signal in said selective complementor response thereto and thereby leave the polarity of its system function unchanged;

a first controlled latch connected for selecting said stream of real samples of a complex baseband signal from said selective complementor response, by responding to the less significant bit of said modulo-four binary count assuming a first of two values thereof to latch a current sample from said selective complementor response; and a second controlled latch connected for selecting said stream of real samples of a complex baseband signal from said selective complementor response, by responding to said less significant bit of said modulo-four binary count assuming a second of two values thereof to latch a current sample from said selective complementor response.

11. The digital television signal receiver of claim 10, wherein said adaptive channel-equalization circuitry employs synchronous equalization with adjoining kernel taps separated by intervals each corresponding to a symbol epoch.

12. The digital television signal receiver of claim 7; wherein said local oscillator is of a type for generating local oscillations of such frequency said final intermediate-frequency signal has a carrier frequency with a number of cycles per second that is an integer multiple, M, of the number of symbols per second in said digital television signal selected for reception; wherein said analog-to-digital conversion circuitry is of a type for digitizing said amplified low-band intermediate-frequency signal to generate a digitized amplified low-band intermediate-frequency signal sampled substantially four times per cycle of its carrier frequency; and wherein said digital demodulating circuitry comprises:

a counter connected for counting samples of said digitized amplified low-band intermediate-frequency signal to generate a modulo-four binary count thereof;

a selective complementor connected for generating a selective complementor response, by responding to the more significant bit of said modulo-four binary count having a first of two values thereof to complement said digitized amplified low-band intermediate-frequency signal in said selective complementor response thereto and thereby reverse the polarity of its system function, and by responding to said more significant bit of said modulo-four binary count having a second of said two values thereof to repeat said digitized amplified low-band intermediate-frequency signal in said selective complementor response thereto and thereby leave the polarity of its system function unchanged;

a first controlled latch connected for selecting said stream of real samples of a complex baseband signal from said selective complementor response, by responding to the less significant bit of said modulo-four binary count assuming a first of two values thereof to latch a current sample from said selective complementor response; and a second controlled latch connected for selecting said stream of real samples of a complex baseband signal from said selective complementor response, by responding to said less significant bit of said modulo-four binary count assuming a second of two values thereof to latch a current sample from said selective complementor response.

13. The digital television signal receiver of claim 12 wherein said adaptive channel-equalization circuitry employs fractional equalization with adjoining kernel taps separated intervals each corresponding to (M−$^{1}$1)/M times a symbol epoch, M being an integer greater than one.

14. The digital television signal receiver of claim 12 wherein said local oscillator is of a type for generating local oscillations of such frequency said final intermediate-frequency signal has a carrier frequency with a number of cycles per second that is twice the number of symbols per second in said digital television signal selected for reception.

15. The digital television signal receiver of claim 14 wherein said adaptive channel-equalization circuitry employs fractional equalization with adjoining kernel taps separated intervals each corresponding to one-half a symbol epoch.

* * * * *